(12) United States Patent
Cheng et al.

(10) Patent No.: US 12,498,770 B2
(45) Date of Patent: Dec. 16, 2025

(54) FOLDING MECHANISM AND ELECTRONIC DEVICE

(71) Applicant: VIVO MOBILE COMMUNICATION CO., LTD., Dongguan (CN)

(72) Inventors: Dongcun Cheng, Dongguan (CN); Zongwen He, Dongguan (CN); Zhengjun Luo, Dongguan (CN); Fei Dong, Dongguan (CN); Ximing Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 240 days.

(21) Appl. No.: 18/515,231

(22) Filed: Nov. 20, 2023

(65) Prior Publication Data

US 2024/0094785 A1 Mar. 21, 2024

Related U.S. Application Data

(63) Continuation of application No. PCT/CN2022/093189, filed on May 17, 2022.

(30) Foreign Application Priority Data

May 21, 2021 (CN) .......................... 202110560620.0

(51) Int. Cl.
*G06F 1/16* (2006.01)

(52) U.S. Cl.
CPC .......... *G06F 1/1681* (2013.01); *G06F 1/1616* (2013.01); *G06F 1/1652* (2013.01); *G06F 1/1656* (2013.01)

(58) Field of Classification Search
CPC .... G06F 1/1681; G06F 1/1616; G06F 1/1652; G06F 1/1656; G06F 1/1618; H04M 1/0268; H04M 1/022
See application file for complete search history.

(56) References Cited

U.S. PATENT DOCUMENTS 8,854,834 B2 * 10/2014 O'Connor ............. G06F 1/1681
16/334
9,600,035 B2 * 3/2017 Park ...................... G06F 1/1681
(Continued)

FOREIGN PATENT DOCUMENTS

| CN | 110784570 A | 2/2020 |
| CN | 111614806 A | 9/2020 |

(Continued)

OTHER PUBLICATIONS

International Search Report issued in corresponding International Application No. PCT/CN2022/093189, mailed Aug. 5, 2022, 4 pages.

(Continued)

*Primary Examiner* — Anthony M Haughton
*Assistant Examiner* — Theron S Milliser
(74) *Attorney, Agent, or Firm* — IPX PLLC

(57) ABSTRACT

A folding mechanism is provided, including a base portion, a first housing seat, a second housing seat, a first screen supporting plate, a second screen supporting plate, and a third screen supporting plate. The first housing seat is rotatably disposed on the first screen supporting plate, the second housing seat is rotatably disposed on the second screen supporting plate, and the third screen supporting plate is movably connected to the base portion in its own support direction. The first housing seat is rotatably connected to the base portion by a first swing arm, the second housing seat is rotatably connected to the base portion by a second swing arm, the first screen supporting plate is slidably and rotatably connected to the base portion by a third swing arm, and the second screen supporting plate is slidably and rotatably connected to the base portion by a fourth swing arm.

20 Claims, 9 Drawing Sheets

(56) References Cited

U.S. PATENT DOCUMENTS

| | | | | |
|---|---|---|---|---|
| 9,665,126 | B2* | 5/2017 | O'Connor | G06F 1/1681 |
| 9,848,502 | B1* | 12/2017 | Chu | G06F 1/1681 |
| 10,110,717 | B1* | 10/2018 | Liu | H04M 1/0268 |
| 10,133,303 | B2* | 11/2018 | Park | G06F 1/1616 |
| 10,429,896 | B2* | 10/2019 | Kuramochi | G06F 1/1681 |
| 10,480,225 | B1* | 11/2019 | Hsu | G06F 1/1616 |
| 10,761,573 | B2* | 9/2020 | Hsu | G06F 1/1681 |
| 10,761,574 | B1* | 9/2020 | Hsu | G06F 1/1616 |
| 10,883,534 | B2* | 1/2021 | Bae | G06F 1/1652 |
| 11,009,061 | B2* | 5/2021 | Chang | F16C 11/04 |
| 11,009,919 | B2* | 5/2021 | Hsu | F16C 11/04 |
| 11,048,296 | B2* | 6/2021 | Hsu | G06F 1/1652 |
| 11,194,366 | B2* | 12/2021 | Cheng | G06F 1/1626 |
| 11,223,710 | B2* | 1/2022 | Cheng | H04M 1/0268 |
| 11,224,137 | B2* | 1/2022 | Hsu | E05D 11/0081 |
| 11,243,578 | B2* | 2/2022 | Torres | G06F 1/1616 |
| 11,301,006 | B2* | 4/2022 | Hsu | F16C 11/04 |
| 11,353,931 | B2* | 6/2022 | Hsu | E05D 1/04 |
| 11,379,013 | B2* | 7/2022 | Cha | G06F 1/1652 |
| 11,467,633 | B2* | 10/2022 | Liao | G06F 1/1641 |
| 11,706,886 | B2* | 7/2023 | Wu | H05K 5/0217 361/807 |
| 11,846,997 | B2* | 12/2023 | Liao | H04M 1/0216 |
| 11,907,027 | B2* | 2/2024 | Torres | G06F 1/1616 |
| 11,914,433 | B2* | 2/2024 | Liao | H04M 1/0268 |
| 12,047,521 | B2* | 7/2024 | Liao | H04M 1/0268 |
| 12,316,791 | B2* | 5/2025 | Liao | G06F 1/1681 |
| 12,332,703 | B2* | 6/2025 | Liao | F16C 11/04 |
| 2012/0120627 | A1* | 5/2012 | O'Connor | G06F 1/1641 16/374 |
| 2014/0373338 | A1* | 12/2014 | O'Connor | G06F 1/1641 29/592.1 |
| 2016/0085265 | A1* | 3/2016 | Park | H04M 1/0268 361/807 |
| 2017/0123455 | A1* | 5/2017 | Park | H04M 1/0268 |
| 2019/0086965 | A1* | 3/2019 | Kuramochi | G06F 1/1652 |
| 2020/0103935 | A1 | 4/2020 | Hsu | |
| 2020/0267856 | A1* | 8/2020 | Hsu | G06F 1/1652 |
| 2020/0310497 | A1* | 10/2020 | Hsu | E05D 3/18 |
| 2020/0355216 | A1* | 11/2020 | Bae | G06F 1/1652 |
| 2020/0363843 | A1* | 11/2020 | Cheng | G06F 1/1681 |
| 2020/0371553 | A1* | 11/2020 | Hsu | G06F 1/1624 |
| 2020/0392983 | A1* | 12/2020 | Chang | F16C 11/04 |
| 2020/0409427 | A1* | 12/2020 | Hsu | G06F 1/1681 |
| 2020/0409429 | A1* | 12/2020 | Hsu | E05D 11/06 |
| 2021/0034116 | A1* | 2/2021 | Torres | G06F 1/1681 |
| 2021/0067614 | A1* | 3/2021 | Cheng | G06F 1/1681 |
| 2021/0181808 | A1* | 6/2021 | Liao | H04M 1/0216 |
| 2021/0271294 | A1* | 9/2021 | Liao | G06F 1/181 |
| 2021/0355988 | A1* | 11/2021 | Cheng | G06F 1/1681 |
| 2021/0365073 | A1* | 11/2021 | Cha | G06F 1/1652 |
| 2022/0035422 | A1* | 2/2022 | Torres | G09F 9/301 |
| 2022/0104370 | A1* | 3/2022 | Wu | G06F 1/1681 |
| 2022/0303371 | A1* | 9/2022 | Liao | H04M 1/0216 |
| 2023/0054923 | A1* | 2/2023 | Liao | G06F 1/1681 |
| 2024/0094785 | A1* | 3/2024 | Cheng | H04M 1/022 |
| 2024/0160253 | A1* | 5/2024 | Liao | H04M 1/0268 |
| 2024/0340365 | A1* | 10/2024 | Liao | H04M 1/0216 |

FOREIGN PATENT DOCUMENTS

| | | |
|---|---|---|
| CN | 111692196 A | 9/2020 |
| CN | 212509197 U | 2/2021 |
| CN | 212624631 U | 2/2021 |
| CN | 113194183 A | 7/2021 |

OTHER PUBLICATIONS

First Office Action issued in related Chinese Application No. 202110560620.0, mailed Jan. 3, 2023, 4 pages.

* cited by examiner

FOLDING MECHANISM AND ELECTRONIC DEVICE

CROSS-REFERENCE TO RELATED APPLICATIONS

This application is a continuation of International Application No. PCT/CN2022/093189, filed May 17, 2022, which claims priority to Chinese Patent Application No. 202110560620.0, filed May 21, 2021. The entire contents of each of the above-referenced applications are expressly incorporated herein by reference.

TECHNICAL FIELD

This application relates to the field of communication device technologies, and specifically to a folding mechanism and an electronic device.

BACKGROUND

With the application of various advanced technologies to electronic devices, electronic devices are updated faster and faster, and requirements of users for electronic devices also become higher and higher. Flexible screens, for example, facilitate the rapid development of foldable electronic devices, which in turn provides electronic devices with large display areas and good portability.

However, during the use of folding electronic devices, bending positions of flexible screens are easily prone to squeezes to bend excessively, which adversely affects the service life of the flexible screens.

SUMMARY

An objective of embodiments of this application is to provide a folding mechanism and an electronic device.

According to a first aspect, an embodiment of this application discloses a folding mechanism, including a base portion, a first housing seat, a second housing seat, a first screen supporting plate, a second screen supporting plate, and a third screen supporting plate, where the first housing seat is rotatably disposed on the first screen supporting plate, the first housing seat and the first screen supporting plate are disposed on a first side of the base portion, the second housing seat is rotatably disposed on the second screen supporting plate, the second housing seat and the second screen supporting plate are disposed on a second side of the base portion, the first side and the second side are disposed facing opposite directions, and the third screen supporting plate is movably connected to the base portion in its own support direction;

the folding mechanism further includes a swing arm assembly, the swing arm assembly includes a first swing arm, a second swing arm, a third swing arm, and a fourth swing arm, the first swing arm and the third swing arm are both disposed on a same side as the first housing seat, and the second swing arm and the fourth swing arm are disposed on a same side as the second housing seat;

a first end of the first swing arm is rotatably connected to the base portion, a second end of the first swing arm is rotatably connected to the first housing seat, a first end of the third swing arm is rotatably connected to the base portion, a second end of the third swing arm slidably fits the first housing seat, the second end of the third swing arm and the first screen supporting plate are relatively slidable and fit rotatably, and a rotation axis of the first end of the first swing arm and a rotation axis of the first end of the third swing arm are distributed spaced apart from each other;

a first end of the second swing arm is rotatably connected to the base portion, a second end of the second swing arm is rotatably connected to the second housing seat, a first end of the fourth swing arm is rotatably connected to the base portion, a second end of the fourth swing arm slidably fits the second housing seat, the second end of the fourth swing arm and the second screen supporting plate are relatively slidable and fit rotatably, and a rotation axis of the first end of the second swing arm and a rotation axis of the first end of the fourth swing arm are distributed spaced apart from each other;

the folding mechanism has an unfolded state and a folded state, in the unfolded state, respective screen supporting surfaces of the first screen supporting plate, the second screen supporting plate, and the third screen supporting plate are coplanar, and a distance between a part of the base portion facing the third screen supporting plate and the third screen supporting plate in the support direction is a first distance; and in the folded state, the distance between the part of the base portion facing the third screen supporting plate and the third screen supporting plate in the support direction is a second distance, and the second distance is smaller than the first distance.

According to a second aspect, an embodiment of this application discloses an electronic device, including a flexible screen, a first housing, a second housing, and the foregoing folding mechanism, where the first housing is fastened on a first housing seat, the second housing is fastened on a second housing seat, and the flexible screen is disposed on the first housing, the second housing, the first screen supporting plate, the second screen supporting plate, and the third screen supporting plate.

Embodiments of this application provide a folding mechanism and an electronic device. The folding mechanism includes a base portion, a first housing seat, a second housing seat, a first screen supporting plate, a second screen supporting plate, a third screen supporting plate, and a swing arm assembly. The first housing seat is rotatably connected to the base portion by a first swing arm. The second housing seat is rotatably connected to the base portion by a second swing arm. The first screen supporting plate is slidably and rotatably connected to the base portion by a third swing arm. The second screen supporting plate is slidably and rotatably connected to the base portion by a fourth swing arm. Rotation axes of the first swing arm and the third swing arm are spaced apart from each other. Rotation axes of the second swing arm and the fourth swing arm are spaced apart from each other. In this way, when the folding mechanism is switched to a folded state, the first screen supporting plate and the second screen supporting plate can form a flare-shaped structure with a flared opening facing the base portion, to provide a larger accommodating space for a folded part in a flexible screen fitting the folding mechanism. In addition, the third screen supporting plate is movably connected to the base portion in a support direction, so that when the folding mechanism is switched to the folded state, the third screen supporting plate may provide a clearance space for the flexible screen, to further increase a size of the accommodating space for the folded part in the flexible screen. In this way, a phenomenon that a bending position of the flexible screen is squeezed to excessively bend is avoided, and the service life of the flexible screen is improved.

BRIEF DESCRIPTION OF DRAWINGS

The accompanying drawings described herein are used to provide a further understanding of this application and form part of this application, and the schematic embodiments of this application and their descriptions are used to explain this application and do not constitute an inappropriate limitation to this application. In the accompanying drawings.

Figure 1:
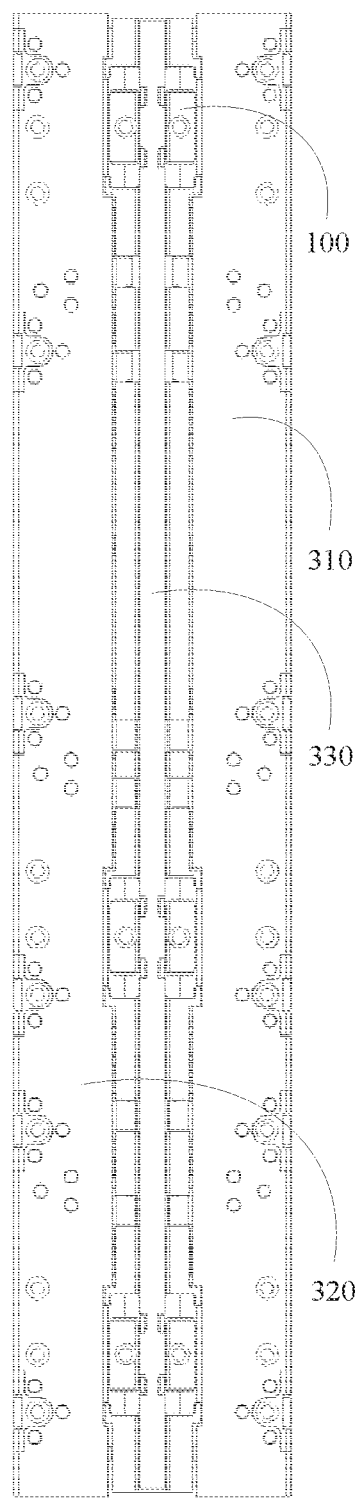
FIG. 1 is a schematic structural diagram of a folding mechanism according to an embodiment of this application.

100—base portion, 110—third rotatable portion, 120—fourth rotatable portion, 130—accommodating groove, 210—first housing seat, 211—sliding slot, 212—clearance hole, 220—second housing seat, 310—first screen supporting plate, 311—relief hole, 320—second screen supporting plate, 330—third screen supporting plate, 340—elastic restoration member, 401—first rotatable portion, 402—second rotatable portion, 410—first swing arm, 420—second swing arm, 430—third swing arm, 431—first sliding block, 432—second sliding block, 440—fourth swing arm, 510—track body, 511—first limiting portion, 511a—hollow cavity, 512—second limiting portion, 513—partition member. 514—assembly notch, 520—slide member, 521—first sliding portion, 522—second sliding portion, 610—first connecting shaft, 620—second connecting shaft, 631—first gear, 632—second gear, 633—first meshing teeth, 634—second meshing teeth, 640—gear holder, 651—first cam sleeve, 652—second cam sleeve, 653—connecting rod, 660—elastic member, 671—first limiting member, 672—second limiting member, 673—mounting member, and 674—circlip.

DETAILED DESCRIPTION

The following describes the technical solutions in embodiments of this application with reference to the accompanying drawings in embodiments of this application. Apparently, the described embodiments are some of embodiments of this application rather than all of the embodiments. All other embodiments obtained by a person of ordinary skill in the art based on embodiments of this application without creative efforts shall fall within the protection scope of this application.

The specification and claims of this application, and terms "first" and "second" are used to distinguish similar objects, but are unnecessarily used to describe a specific sequence or order. It may be understood that the data used in such a way is interchangeable in proper circumstances, so that embodiments of this application can be implemented in other sequences than the sequence illustrated or described herein. Objects distinguished by "first", "second", and the like are usually of one type, and a quantity of the objects is not limited. For example, one or more first objects may be provided. In addition, "and/or" in this specification and the claims represents at least one of the connected objects. The character "/" generally indicates an "or" relationship between associated objects.

The folding mechanism and the electronic device provided in the embodiments of this application are described in detail below through specific embodiments and their application scenarios in conjunction with the accompanying drawings.

As shown in FIG. 1 to FIG. 21, embodiments of this application disclose a folding mechanism. The folding mechanism may be used in an electronic device, and a flexible screen fits the folding mechanism to form an electronic device with a folding capability, to provide electronic device with a large display area and good portability, so that user experience is improved.

The folding mechanism includes a base portion 100, a first housing seat 210, a second housing seat 220, a first screen supporting plate 310, a second screen supporting plate 320, and a third screen supporting plate 330. The first housing seat 210 is disposed on the first screen supporting plate 310. The second housing seat 220 is disposed on the second screen supporting plate 320. In addition, the folding mechanism further includes a swing arm assembly. The first housing seat 210 and the second housing seat 220 are movably mounted on the base portion 100 by the swing arm assembly, so that the first screen supporting plate 310, the second screen supporting plate 320, the first housing seat 210, and the second housing seat 220 all form a whole with the base portion 100. In addition, the first housing seat 210 rotatably fits the first screen supporting plate 310, and the second housing seat 220 rotatably fits the second screen supporting plate 320, so that as the first housing seat 210 and the second housing seat 220 rotate relatively, a relative rotational angle between the first screen supporting plate 310 and the second screen supporting plate 320 can exceed 180°. In this way, when the folding mechanism is switched to a folded state, the first screen supporting plate 310 and the second screen supporting plate 320 can form a flare-shaped structure, to provide a larger accommodating space for a middle part of the flexible screen, to be specific, a folded part in the flexible screen. In addition, the third screen supporting plate 330 and a base body move relatively, so that when the electronic device including the folding mechanism is folded, the third screen supporting plate 330 can provide a particular clearance space for the flexible screen, to further increase the accommodating space for the middle part of the flexible screen. In this way, the flexible screen is kept from being excessively folded, to avoid damage to the flexible screen.

As discussed above, the first housing seat 210 is disposed on the first screen supporting plate 310. The second housing seat 220 is disposed on the second screen supporting plate 320. The first housing seat 210 and the first screen supporting plate 310 are disposed on a first side of the base portion 100. The second housing seat 220 and the second screen supporting plate 320 are disposed on a second side of the base portion 100. The first side and the second side are disposed facing opposite directions. In some embodiments, the base body, the first housing seat 210, the second housing seat 220, the first screen supporting plate 310, and the second screen supporting plate 320 may all be made of a material with a high structural strength, for example, metal or plastic, to ensure that connection and fitting relationships between the components are all relatively stable, so that a reliable supporting effect can be provided for the flexible screen.

In some embodiments, parameters such as structures and sizes of the first housing seat 210 and the second housing seat 220 may be different, and are all flexibly designed according to another device, for example, the flexible screen of the electronic device. In some embodiments, the structures of the first housing seat 210 and the second housing seat 220 may be designed to be symmetrical, and sizes are correspondingly the same, to facilitate the processing and assembly work of the entire folding mechanism.

Similarly, respective sizes of the first screen supporting plate 310 and the second screen supporting plate 320 may be determined based on a parameter, for example, an area of a flexible screen that needs to be supported. In some embodiments, the first screen supporting plate 310 and the second screen supporting plate 320 may both have rectangular or approximately rectangular structures, to improve a supporting effect for the flexible screen. Furthermore, the structures of the first screen supporting plate 310 and the second screen supporting plate 320 may be symmetrically disposed, to reduce the difficulty of processing and assembly of the entire folding mechanism.

For ease of description, relationships between associated components are described below based on that the first housing seat 210 and the second housing seat 220 are symmetrically disposed and the first screen supporting plate 310 and the second screen supporting plate 320 are symmetrically disposed and by using the first housing seat 210 and the first screen supporting plate 310 as an example. For the relationship between the second housing seat 220 and the second screen supporting plate 320, refer to the corresponding design of the first housing seat 210 and the first screen supporting plate 310. In some embodiments, the first screen supporting plate 310 may be supported on the first housing seat 210, between which a connection relationship may be formed. For example, a rotatable connection relationship may be formed between the two by a rotating shaft, to ensure that the first screen supporting plate 310 and the first housing seat 210 can rotate relative to each other. In some embodiments, the first screen supporting plate 310 and the first housing seat 210 may only support each other. As for a rotatable fitting relationship between the two, the swing arm assembly may be used to enable the first screen supporting plate 310 to rotate relative to the first housing seat 210.

As discussed above, the third screen supporting plate 330 is movably connected to the base portion 100 in its own support direction. In some embodiments, a material of the third screen supporting plate 330 may be the same as that of the first screen supporting plate 310. The third screen supporting plate 330 may be connected to the base portion 100 by a limiting structure, so that through a limiting function provided by the limiting structure, the third screen supporting plate 330 can only move relative to the base portion 100 in its own support direction.

As for a movement driving source of the third screen supporting plate 330, in a process in which the third screen supporting plate 330 moves toward the base portion 100, or colloquially, in a process in which the flexible screen of the electronic device is disposed facing upward and is folded, a squeeze provided by the flexible screen with a deformation may be used to drive the third screen supporting plate 330 to move downward to be closer to the base portion 100. Conversely, in a process in which the third screen supporting plate 330 moves away from the base portion 100, or colloquially, in a process in which the electronic device is unfolded and the flexible screen is disposed facing upward, the first housing seat 210 and/or the second housing seat 220 and a side of the third screen supporting plate 330 facing the base portion 100 may limit each other. As the first housing seat 210 and/or the second housing seat 220 rotate/rotates relative to the base portion 100, the third screen supporting plate 330 is lifted, to make the third screen supporting plate 330 move farther away from the base portion 100, and eventually provide support for the flexible screen.

In other embodiments of this application, the third screen supporting plate 330 may further be connected to the base portion 100 by a component with an extension and retraction capability, for example, a spring, so that in a process in which a status of the folding mechanism is switched, the third screen supporting plate 330 may move relative to the base portion 100 in its own support direction. A chosen spring may form different fitting relationships with the third screen supporting plate 330 by changing a parameter, for example, a model of the spring. For example, when the folding mechanism is in an unfolded state and the third screen supporting plate 330 is flush with the first screen supporting plate 310, the spring may be in any one of a stretched state, a compressed state, or a relaxed state, to adapt to different requirements.

Figure 6:
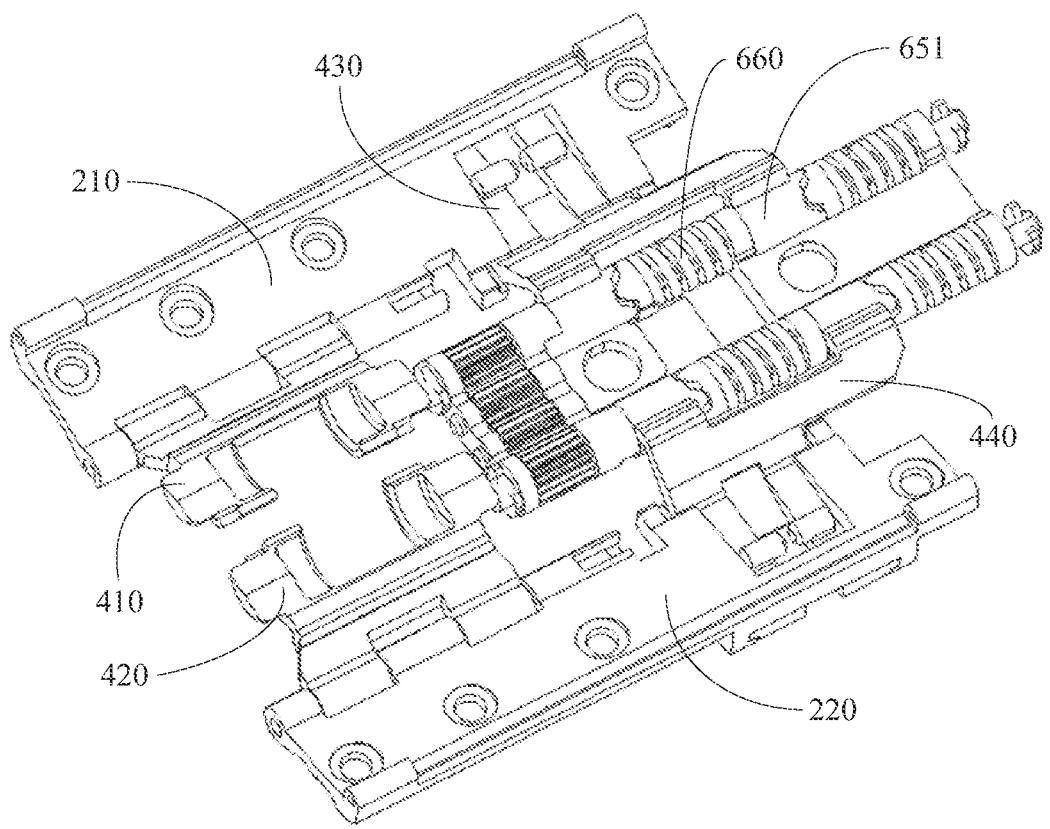
FIG. 6 is a schematic diagram of a partial structure including a first swing arm and a second swing arm in a folding mechanism according to an embodiment of this application.

As shown in FIG. 6, the swing arm assembly includes a first swing arm 410, a second swing arm 420, a third swing arm 430, and a fourth swing arm 440, which may all be made of a material with a high structural strength and strong wear resistance, for example, metal, to ensure that the swing arm assembly has a long service life and high reliability.

The first swing arm 410 and the third swing arm 430 are both disposed on a same side as the first housing seat 210. To be specific, the first swing arm 410, the third swing arm 430, and the first housing seat 210 are all located on the first side of the base portion 100.

The second swing arm 420 and the fourth swing arm 440 are both disposed on a same side as the second housing seat 220. To be specific, the second swing arm 420, the fourth swing arm 440, and the second housing seat 220 are all located on the second side of the base portion 100.

A first end of the first swing arm 410 is rotatably connected to the base portion 100, so that the first swing arm 410 may rotate around the base portion 100 through the first end thereof. A second end of the first swing arm 410 is rotatably connected to the first housing seat 210, so that the first swing arm 410 may rotate relative to the first housing seat 210 through the second end thereof. In some embodiments, the two opposite ends of the first swing arm 410 may form rotatable connection relationships with the base portion 100 and the first housing seat 210 respectively through pin shaft structures. In some embodiments, through another correspondingly disposed arc-shaped fitting structure, the two opposite ends of the first swing arm 410 can form rotatable fitting relationships with the base portion 100 and the first housing seat 210 respectively. For conciseness, details are not described herein.

A first end of the third swing arm 430 is rotatably connected to the base portion 100, so that the third swing arm 430 may rotate around the base portion 100 through the first end thereof. A second end of the third swing arm 430 slidably fits the first housing seat 210, so that in a rotation process of the third swing arm 430, the second end of the third swing arm 430 and the first housing seat 210 have a capability of sliding relatively. Correspondingly, the second end of the third swing arm 430 and the first screen supporting plate 310 are relatively slidable and fit rotatably, so that during the implementation of assembling and connecting the third swing arm 430 and the first screen supporting plate 310, through swings of the second end of the third swing arm 430, the first screen supporting plate 310 is driven to rotate relative to the first housing seat 210.

To ensure that the first housing seat 210 and the first screen supporting plate 310 can rotate relatively, a rotation axis of the first end of the first swing arm 410 and a rotation axis of the first end of the third swing arm 430 are spaced apart from each other, so that as the first swing arm 410 and the third swing arm 430 rotate relative to the base portion 100, the second end of the first swing arm 410 and the second end of the third swing arm 430 can rotate relatively, to enable the first screen supporting plate 310 to rotate relative to the first housing seat 210. In some embodiments, the rotation axis of the first end of the first swing arm 410 and the rotation axis of the first end of the third swing arm 430 are parallel to each other, so that the stability of rotation processes of the first swing arm 410 and the third swing arm 430 can be adequately improved.

A first end of the second swing arm 420 is rotatably connected to the base portion 100, so that the second swing arm 420 may rotate around the base portion 100 through the first end thereof. A second end of the second swing arm 420 is rotatably connected to the second housing seat 220, so that the second swing arm 420 may rotate relative to the second housing seat 220 through the second end thereof. In some embodiments, similar to the first swing arm 410, the two opposite ends of the second swing arm 420 may form rotatable connection relationships with the base portion 100 and the second housing seat 220 respectively through pin shaft structures. In some embodiments, through another correspondingly disposed arc-shaped fitting structure, the two opposite ends of the second swing arm 420 can form rotatable fitting relationships with the base portion 100 and the second housing seat 220 respectively.

A first end of the fourth swing arm 440 is rotatably connected to the base portion 100, so that the fourth swing arm 440 may rotate around the base portion 100 through the first end thereof. A second end of the fourth swing arm 440 slidably fits the second housing seat 220, so that in a rotation process of the fourth swing arm 440, the second end of the fourth swing arm 440 and the second housing seat 220 have a capability of sliding relatively. Correspondingly, the second end of the fourth swing arm 440 and the second screen supporting plate 320 are relatively slidable and fit rotatably, so that during the implementation of assembling and connecting the fourth swing arm 440 and the second screen supporting plate 320, through swings of the second end of the fourth swing arm 440, the second screen supporting plate 320 is driven to rotate relative to the second housing seat 220.

Similarly, to ensure that the second housing seat 220 and the second screen supporting plate 320 can rotate relatively, a rotation axis of the first end of the second swing arm 420 and a rotation axis of the first end of the fourth swing arm 440 are spaced apart from each other, so that as the second swing arm 420 and the fourth swing arm 440 rotate relative to the base portion 100, the second end of the second swing arm 420 and the second end of the fourth swing arm 440 can rotate relatively, to enable the second screen supporting plate 320 to rotate relative to the second housing seat 220. In some embodiments, the rotation axis of the first end of the second swing arm 420 and the rotation axis of the first end of the fourth swing arm 440 are parallel to each other, so that the stability of rotation processes of the second swing arm 420 and the fourth swing arm 440 can be adequately improved.

Based on the foregoing structure, components in the folding mechanism can move relatively under the action of an external force, so that the folding mechanism has the unfolded state and the folded state. The external force may be a force applied by a user to the electronic device, or, the external force may be a drive force provided by a component, for example, a drive motor, built in the electronic device. This is not limited herein.

When the folding mechanism is in the unfolded state, respective screen supporting surfaces of the first screen supporting plate 310, the second screen supporting plate 320, and the third screen supporting plate 330 are coplanar, and a distance between a part of the base portion 100 facing the third screen supporting plate 330 and the third screen supporting plate 330 in the support direction is a first distance. When the folding mechanism is in the folded state, the distance between the part of the base portion 100 facing the third screen supporting plate 330 and the third screen supporting plate 330 in the support direction is a second distance, and the second distance is smaller than the first distance.

In other words, in a process in which the folding mechanism is switched from the unfolded state to the folded state, the third screen supporting plate 330 moves toward the base portion 100 by a preset distance, to provide a larger accommodating space for the flexible screen fitting the folding mechanism. Conversely, in a process in which the folding mechanism is switched to the unfolded state, the third screen supporting plate 330 moves away from the base portion 100 by a preset distance, so that the third screen supporting plate 330 provides adequate support for the flexible screen fitting the folding mechanism.

In addition, based on the foregoing connection relationship between the first housing seat 210 and the first screen supporting plate 310 and assembly relationship between the first swing arm 410 and the third swing arm 430, in a case that the folding mechanism is in the unfolded state, respective first edges of the first screen supporting plate 310 and the second screen supporting plate 320 are both located between respective second edges, to be specific, for the first screen supporting plate 310 and the second screen supporting plate 320, edges located on outer sides are the second edges, and edges located on inner sides are the first edges. Correspondingly, the third screen supporting plate 330 is located between the first screen supporting plate 310 and the second screen supporting plate 320, the three jointly forming a screen supporting surface of the folding mechanism, to provide support for the flexible screen fitting the folding mechanism. When the folding mechanism is in the folded state, through the connection relationships between the components in the folding mechanism, the first screen supporting plate 310 may rotate relative to the base portion 100 along with the first housing seat 210, and the first screen supporting plate 310 may also rotate relative to the first housing seat 210, so that the first screen supporting plate 310 and the second screen supporting plate 320 form a flare-shaped structural member, and a flare opening faces the base portion 100. In this case, a distance between the respective first edges of the first screen supporting plate 310 and the second screen supporting plate 320 is greater than a distance between the respective second edges of the first screen supporting plate 310 and the second screen supporting plate 320. This may further increase a size of the accommodating space for the folded part in the flexible screen, and together with the clearance space provided by the third screen supporting plate 330 near the base portion 100, the accommodating space for the folded part in the flexible screen during folding is increased as much as possible.

Embodiments of this application provide a folding mechanism and an electronic device. As discussed above, the folding mechanism includes a base portion 100, a first housing seat 210, a second housing seat 220, a first screen supporting plate 310, a second screen supporting plate 320, a third screen supporting plate 330, and a swing arm assembly. The first housing seat 210 is rotatably connected to the base portion 100 by a first swing arm 410. The second housing seat 220 is rotatably connected to the base portion 100 by a second swing arm 420. The first screen supporting plate 310 is slidably and rotatably connected to the base portion 100 by a third swing arm 430. The second screen supporting plate 320 is slidably and rotatably connected to the base portion 100 by a fourth swing arm 440. Rotation axes of the first swing arm 410 and the third swing arm 430 are spaced apart from each other. Rotation axes of the second swing arm 420 and the fourth swing arm 440 are spaced apart from each other. In this way, when the folding mechanism is switched to a folded state, the first screen supporting plate 310 and the second screen supporting plate 320 can form a flare-shaped structure with a flared opening facing the base portion, to provide a larger accommodating space for a folded part in a flexible screen fitting the folding mechanism. In addition, the third screen supporting plate 330 is movably connected to the base portion 100 in a support direction, so that when the folding mechanism is switched to the folded state, the third screen supporting plate 330 may provide a clearance space for the flexible screen, to further increase a size of the accommodating space for the folded part in the flexible screen. In this way, a phenomenon that a bending position of the flexible screen is squeezed to excessively bend is avoided, and the service life of the flexible screen is improved.

As discussed above, the second end of the third swing arm 430 can slide relative to the first housing seat 210. To improve reliability of fitting between the two, in an exemplary solution, a sliding slot 211 may be opened in the first housing seat 210. The second end of the third swing arm 430 slidably fits the sliding slot 211, to improve the stability of fitting between the third swing arm 430 and the first housing seat 210 through the sliding slot 211. In other embodiments of this application, a slidable fitting relationship may be formed between the third swing arm 430 and the first housing seat 210 by a shaft hole structural member.

Further, a clearance hole 212 is opened in an inner wall of the sliding slot 211, a track body 510 is fastened on the first screen supporting plate 310, a slide member 520 is disposed at the second end of the third swing arm 430, the track body 510 passes through the clearance hole 212 and at least partially extends into the sliding slot 211, and the slide member 520 and the track body 510 are relatively slidable and fit rotatably. Through the foregoing simple structure, the second end of the third swing arm 430 can form assembly requirements of relative sliding and rotatable fitting with the first screen supporting plate 310. This can reduce difficulty of processing and assembly. In some embodiments, the track body 510 has a curve structure, and may determine, based on a movement trajectory formed by the slide member 520 along with a rotation process of the third swing arm 430, specific parameters of a structure fitting the slide member 520 in the track body 510, so that in a process in which the third swing arm 430 rotates, the slide member 520 can slide in the track body 510. The foregoing structure can fully utilize an existing structure of the sliding slot 211, and the clearance hole 212 is opened in a bottom wall of the sliding slot 211 to complete assembly work between components, which makes the whole structure more compact.

Similarly, the sliding slot 211 that has a similar structure or the same structure in the first housing seat 210 may also be opened in the second housing seat 220, and the second end of the fourth swing arm 440 slidably fits the sliding slot 211 in the second housing seat 220, to improve the stability of the slidable fitting relationship between the second housing seat 220 and the fourth swing arm 440.

Further, the clearance hole 212 that has a similar structure or the same structure in the first housing seat 210 may also be opened in the inner wall of the sliding slot 211 of the second housing seat 220. The track body 510 is fastened to the second screen supporting plate 320 and the slide member 520 is disposed at the second end of the fourth swing arm 440, so that the track body 510 on the second screen supporting plate 320 passes through the clearance hole 212 in the second housing seat 220 and at least partially extends into the corresponding sliding slot 211, to ensure that the slide member 520 on the second housing seat 220 can stably form an assembly relationship of relative sliding and rotatable fitting with the track body 510 on the second screen supporting plate 320.

In some embodiments, in the entire folding mechanism, a structure of a part located on the first side of the base portion 100 and a structure of a part located on the second side of the base portion 100 may be symmetrically disposed. For example, the first screen supporting plate 310 and the second screen supporting plate 320 are symmetrically disposed. The first housing seat 210 and the second housing seat 220 are symmetrically disposed. The first swing arm 410 and the second swing arm 420 are symmetrically disposed. The third swing arm 430 and the fourth swing arm 440 are symmetrically disposed. In a case that the foregoing technical solution is used, in one aspect, difficulty of processing and assembly can be reduced, and in another aspect, the symmetry of the folding mechanism can be improved, to improve the structural reliability and stability of the folding mechanism, and improve the user experience of the electronic device using the folding mechanism. To facilitate the following description, structures on two opposite sides of the base portion 100 are symmetrical below, and the structure located on the first side of the base portion 100 is used as an example, to describe specific structures of the components and connection relationships between the components in the folding mechanism in detail.

In some embodiments, the slide member 520 may be a long-rod structural member. In a process of assembling the third swing arm 430 and the first screen supporting plate 310, the slide member 520 and the third swing arm 430 that are separately disposed may be arranged in advance, and the slide member 520 is first mounted to the track body 510 on the first screen supporting plate 310. Subsequently, the slide member 520 and the third swing arm 430 are then fastened into a whole through welding or the like, to form a connection relationship of relative sliding and rotatable fitting between the third swing arm 430 and the first screen supporting plate 310.

To reduce the working difficulty of using the foregoing structure including the slide member 520 and the track body 510 to connect the third swing arm 430 and the first screen supporting plate 310, in another embodiment of this application, as shown in FIG. 18 to FIG. 21, the second end of the third swing arm 430 includes a first sliding block 431 and a second sliding block 432, and the first sliding block 431 and the second sliding block 432 are spaced apart from each other in a rotational axis direction of the first swing arm 410, so that in a process of assembling the third swing arm 430 and the first screen supporting plate 310, a part that is mounted in the track body 510 on the first screen supporting plate 310 can extend between the first sliding block 431 and the second sliding block 432, to ensure that the slide member 520 can normally form a fitting relationship with the track body 510. In some embodiments, the first sliding block 431 and the second sliding block 432 may be formed together with the entire third swing arm 430 through die casting or the like. In some embodiments, a whole plate-shaped structure may also be formed at the second end of the third swing arm 430, and through cutting or the like, the first sliding block 431 and the second sliding block 432 that are spaced apart from each other are formed at the second end of the third swing arm 430. A distance between the first sliding block 431 and the second sliding block 432 may be determined based on a size of the track body 510 in a corresponding direction. This is not limited herein.

In addition, the slide member 520 includes a first sliding portion 521 and a second sliding portion 522, the first sliding portion 521 is disposed on the first sliding block 431, the second sliding portion 522 is disposed on the second sliding block 432, and the first sliding portion 521 and the second sliding portion 522 are spaced apart from each other in a rotational axis direction, to ensure that a part of the track body 510 can pass through a gap between the first sliding portion 521 and the second sliding portion 522, and extend between the first sliding block 431 and the second sliding block 432. In addition, in a process of assembling the third swing arm 430 and the first screen supporting plate 310, a spacing between the first sliding block 431 and the second sliding block 432 and a spacing between the first sliding portion 521 and the second sliding portion 522 may also be used to avoid the track body 510, so that the first sliding portion 521 and the second sliding portion 522 both form fitting relationships with the track body 510, to connect the third swing arm 430 and the first screen supporting plate 310 together.

Correspondingly, to adapt to the slide member 520 and the third swing arm 430 of the foregoing structure, the track body 510 to be mounted on the first screen supporting plate 310 may include a first limiting portion 511 and a second limiting portion 512. The first limiting portion 511 and the second limiting portion 512 are distributed in a rotational axis direction, and an assembly notch 514 is provided in at least one of the first limiting portion 511 or the second limiting portion 512, to ensure that the slide member 520 and the track body 510 can be connected to each other by the assembly notch 514, so that the first sliding portion 521 slidably fits the first limiting portion 511, and the second sliding portion 522 slidably fits the second limiting portion 512, to implement that the third swing arm 430 forms a connection relationship of relative sliding and rotatable fitting with the first screen supporting plate 310 through the slide member 520 and the track body 510 that fit each other.

In a case that the foregoing technical solution is used, the slide member 520 including the first sliding portion 521 and the second sliding portion 522 does not need to be separately provided with the third swing arm 430 in advance. Before the third swing arm 430 and the first screen supporting plate 310 are assembled, a fastening connection relationship may be formed between the slide member 520 and the third swing arm 430, so that the third swing arm 430 and the slide member 520 may be integrally formed, to reduce a total quantity of individual components, and improve efficiency of components. In addition, in a process of assembling the third swing arm 430 and the first screen supporting plate 310, the slide member 520 may be directly mounted in the track body 510, so that a subsequent connection procedure of the third swing arm 430 and the slide member 520 is omitted, to improve assembly efficiency.

In some embodiments, structures of the first limiting portion 511 and the second limiting portion 512 may be the same. In this case, the two may both be open structures provided with the assembly notch 514, to ensure that the first sliding portion 521 may fit the first limiting portion 511, and ensure that the second sliding portion 522 may fit the second limiting portion 512. In this case, the first limiting portion 511 needs to provide a complete limiting function for the first sliding portion 521, to be specific, the first sliding portion 521 can only move in a sliding trajectory provided by the first limiting portion 511. Correspondingly, the second limiting portion 512 also needs to provide a complete limiting function for the second limiting portion 512. In some embodiments, respective sliding trajectories of the first limiting portion 511 and the second limiting portion 512 may be in communication, or a blocking structure may be disposed between the first limiting portion 511 and the second limiting portion 512. For this, details are described below.

In other embodiments of this application, the structures of the first limiting portion 511 and the second limiting portion 512 may be different. For example, in a case that the first sliding portion 521 and the second sliding portion 522 are both cylindrical structural members and axes of the two are not collinear. In some embodiments, in a case that sizes of the first sliding portion 521 and the second sliding portion 522 are different, specific structures disposed in the sliding trajectories of the first limiting portion 511 and the second limiting portion 512 are also different. In another example, in a case that structures of the first sliding portion 521 and the second sliding portion 522 are symmetrically disposed, the first limiting portion 511 and the second limiting portion 512 may work together to provide a complete limiting function for the slide member 520. In this case, specific structures of the first limiting portion 511 and the second limiting portion 512 are also different. In some embodiments, upper limiting and lower limiting are used as an example. An upper limiting function may be provided for the slide member 520 through the first limiting portion 511, and a lower limiting function may be provided for the slide member 520 through the second limiting portion 512. In this case, the assembly notch 514 may be correspondingly provided in at least one of the two according to the respective specific structures of the first limiting portion 511 and the second limiting portion 512. For conciseness, this specific implementation is not described in detail herein.

Figure 19:
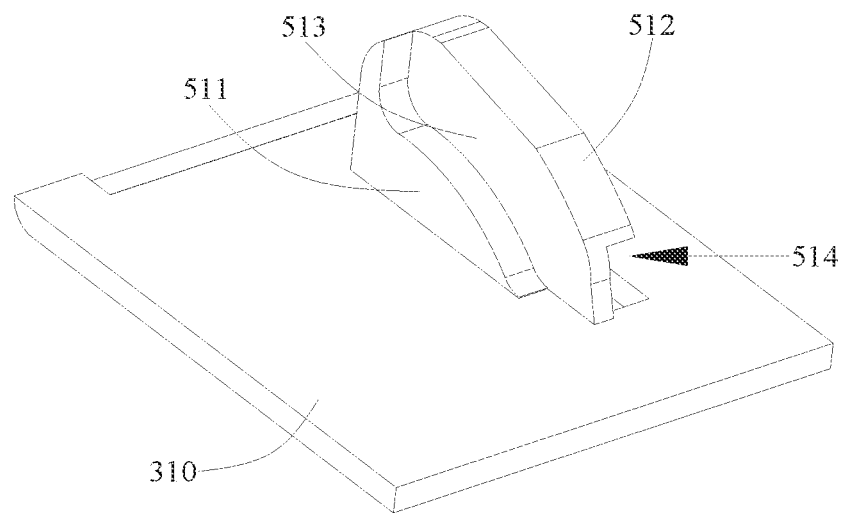
FIG. 19 is a schematic diagram of a partial structure including a track body in a folding mechanism according to an embodiment of this application.
Figure 20:
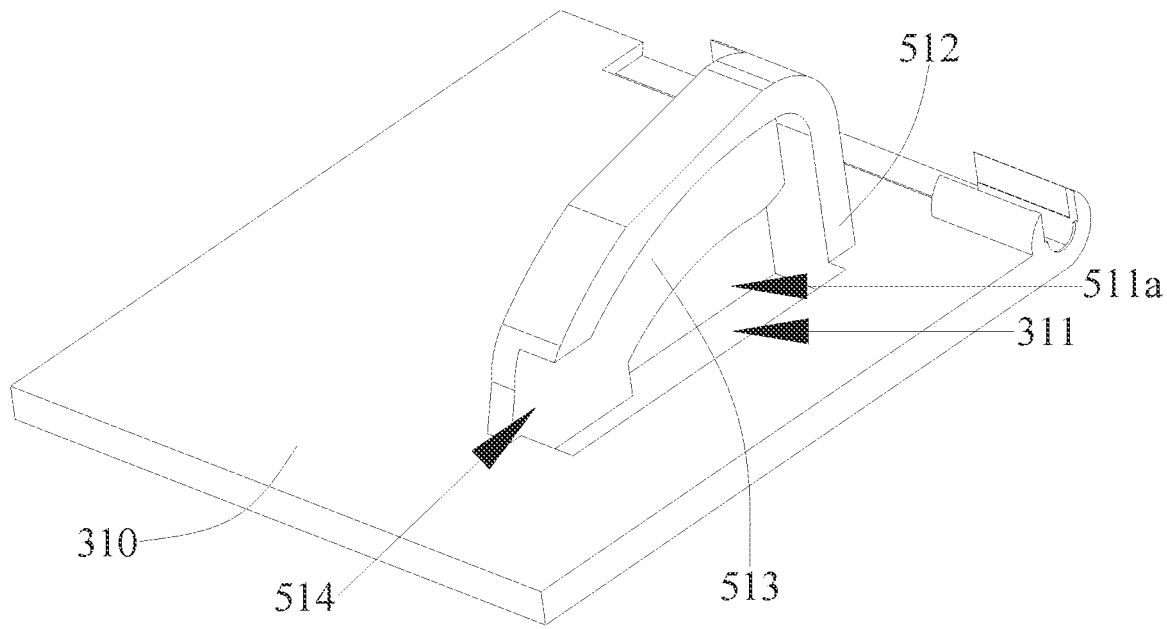
FIG. 20 is a schematic structural diagram of the structure shown in FIG. 19 in another direction.
Figure 21:
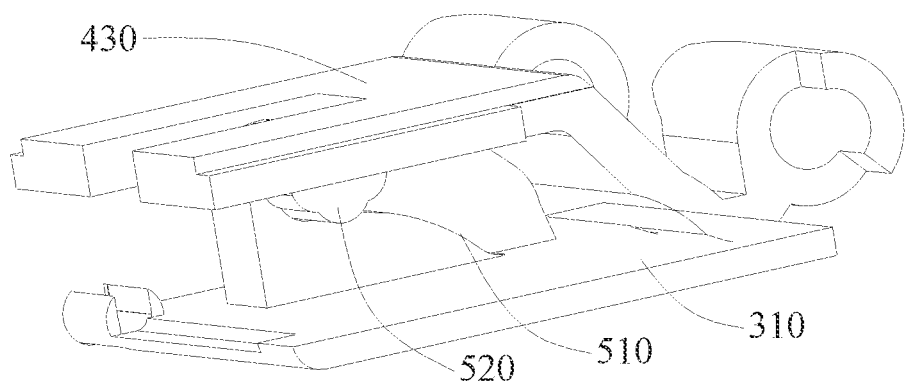
FIG. 21 is an assembly diagram of a track body and a slide member in a folding mechanism according to an embodiment of this application. Reference numerals.

As discussed above, the sliding trajectories of the first limiting portion 511 and the second limiting portion 512 may be in communication. In some embodiments, the first limiting portion 511 and the second limiting portion 512 may both be provided with sliding trajectories of groove-shaped structures, and respective groove-shaped structures of the two extend toward each other to be in communication. In another embodiment of this application, as shown in FIG. 19 and FIG. 20, the track body 510 further includes a partition member 513. The first limiting portion 511 is located on one side of the partition member 513, and the second limiting portion 512 is located on the other side of the partition member 513, to separate the first limiting portion 511 and the second limiting portion 512 through the partition member 513, so that the sliding trajectories of the first limiting portion 511 and the second limiting portion 512 are no longer in communication. In a case that the foregoing technical solution is used, in a rotational axis direction, the partition member 513 is limited between the first sliding portion 521 and the second sliding portion 522, so that the first sliding portion 521 and the second sliding portion 522 can also limit the partition member 513 in the foregoing rotational axis direction, to avoid that because the first sliding portion 521 and/or the second sliding portion 522 move excessively in a rotational axis direction, the slide member 520 and the track body 510 are stuck and cannot normally move relatively.

In some embodiments, the partition member 513 may be a plate-shaped structural member. A thickness of the partition member 513 may be determined according to an actual case, for example, a distance between the first sliding portion 521 and the second sliding portion 522. This is not limited herein. In some embodiments, a formation manner of the entire track body 510 may be determined according to specific structures of the first limiting portion 511 and the second limiting portion 512. For example, in a case that the first limiting portion 511 and the second limiting portion 512 are both provided with complete sliding trajectories, corresponding sliding trajectories may be formed in two opposite sides of a block-shaped structural member through cutting, etching, or the like. Correspondingly, in a case that the structures of the first limiting portion 511 and the second limiting portion 512 are changed, the formation manner of the entire track body 510 may also be correspondingly changed.

In some embodiments, in the rotational axis direction, projections of the first sliding portion 521 and the second sliding portion 522 overlap. In other words, outer shapes of the first sliding portion 521 and the second sliding portion 522 are the same, and corresponding sizes are equal. In this case, processing difficulty of the first sliding portion 521 and the second sliding portion 522 is low, and the stability of respective fitting between the two and the first limiting portion 511 and the second limiting portion 512 is higher. In some embodiments, the first sliding portion 521 and the second sliding portion 522 may both be structural members with a cylindrical shape, to improve smoothness of fitting relationships between the two and the track body 510. In addition, the first sliding portion 521 and the second sliding portion 522 may both have solid structures. This may improve the structural strength of the two, so that it is ensured that the slide member 520 and the track body 510 have high reliability of fitting, to improve comprehensive performance of the entire folding mechanism.

Based on the foregoing embodiments, the corresponding sliding trajectories are disposed on the first limiting portion 511 and the second limiting portion 512, so that it can be ensured that the slide member 520 can form a stable fitting relationship with the track body 510. In addition, as discussed above, a complete sliding trajectory may be formed on at least one of the first limiting portion 511 or the second limiting portion 512.

In another embodiment of this application, the first limiting portion 511 has a first track surface, the second limiting portion 512 has a second track surface, and in the rotational axis direction, a projection of the first track surface is located outside a projection of the second track surface. In other words, shapes of the first track surface used for providing a limiting function in the first limiting portion 511 and the second track surface used for providing a limiting function in the second limiting portion 512 are different, and shapes and sizes of the first sliding portion 521 and the second sliding portion 522 are the same. Therefore, in this embodiment, each of the first limiting portion 511 and the second limiting portion 512 can only provide a partial limiting function for the slide member 520, and the two work together on the slide member 520, so that a complete limiting function can be provided for the slide member 520.

More colloquially, as shown in FIG. 19 and FIG. 20, to facilitate understanding, in the figure, a position of the first screen supporting plate 310 is down, and a position of the entire track body 510 is up. The first limiting portion 511 may provide a lower limiting function for the entire slide member 520, to be specific, the first limiting portion 511 can limit the first sliding portion 521 to move downward. Correspondingly, the second limiting portion 512 may provide an upper limiting function for the entire slide member 520, to be specific, the second limiting portion 512 can limit the second sliding portion 522 to move upward.

When the foregoing technical solution is used, while a complete limiting function can be provided for the entire slide member 520 through the first limiting portion 511 and the second limiting portion 512, the processing difficulty of the entire track body 510 can be further reduced. In some embodiments, in the first limiting portion 511 and the second limiting portion 512, a blocking structure is disposed on neither of an upper side of one of the two and a lower side of the other, so that in a process of forming the track body 510, the track body 510 having the first track surface and the second track surface may be integrally formed through parting die casting or the like. In this way, processing difficulty of the track body 510 is reduced, production efficiency of the entire folding mechanism is improved, and because intermediate procedures are omitted, a problem that precision of the track body 510 is reduced due to processing errors in a procedure and between procedures can be mitigated to a particular degree.

As discussed above, the track body 510 further includes the partition member 513. The partition member 513 may block the sliding trajectories of the first limiting portion 511 and the second limiting portion 512 from communication, and the first limiting portion 511 and the second limiting portion 512 are respectively disposed on two opposite sides of the partition member 513. As shown in FIG. 19, the first limiting portion 511 protrudes relative to the partition member 513 away from the second limiting portion 512, to form the first track surface. Further, the first limiting portion 511 provided with a hollow cavity 511a. A cavity opening of the hollow cavity 511a faces the second limiting portion 512 in a rotational axis direction. When the hollow cavity 511a is disposed, a weight of the entire track body 510 can be reduced. In addition, in a case that the hollow cavity 511a of the foregoing structure is disposed on the first limiting portion 511, the first limiting portion 511 may provide a lower limiting function for the slide member 520, so that a weight of the first limiting portion 511 is reduced as much as possible.

As discussed above, in a case that projections of the first limiting portion 511 and the second limiting portion 512 do not overlap each other, the first limiting portion 511 and the second limiting portion 512 fit each other, to provide a limiting function for the slide member 520. In some embodiments, as shown in FIG. 19 and FIG. 20, the first track surface is located on a side of the first limiting portion 511 away from the first screen supporting plate 310, and the second track surface is located on a side of the second limiting portion 512 facing the first screen supporting plate 310. To be specific, as discussed above, the first limiting portion 511 provides a lower limiting function for the slide member 520, and the second limiting portion 512 provides an upper limiting function for the slide member 520. Based on the foregoing case, as shown in FIG. 20, a relief hole 311 is provided in the first screen supporting plate 310, and in a direction perpendicular to the screen supporting surface of the first screen supporting plate 310, a projection of the second limiting portion 512 is located in the relief hole 311. In some embodiments, a range of the relief hole 311 may be slightly larger than a range of the projection of the second limiting portion 512, to ensure a successful demolding process, and ensure as much as possible a structural strength of an area in which the track body 510 is mounted on the first screen supporting plate 310.

Through the foregoing technical solution, the track body 510 may be formed by using a mold with a vertical snap. An upper mold may be integrally located above the first screen supporting plate 310, and a part of a lower mold extends above the first screen supporting plate 310 through the relief hole 311 from below the first screen supporting plate 310. In a demolding process, the lower mold can be detached from the track body 510 through the relief hole 311 in the first screen supporting plate 310, to complete a processing process. This can further reduce the processing difficulty of the track body 510. In addition, in a case that the foregoing technical solution is used, the first screen supporting plate 310 and the track body 510 may be integrally formed through a mold, so that process steps can be further reduced, to improve assembly efficiency of the entire folding mechanism, and connection reliability between the track body 510 and the first screen supporting plate 310 can be improved.

Figure 18:
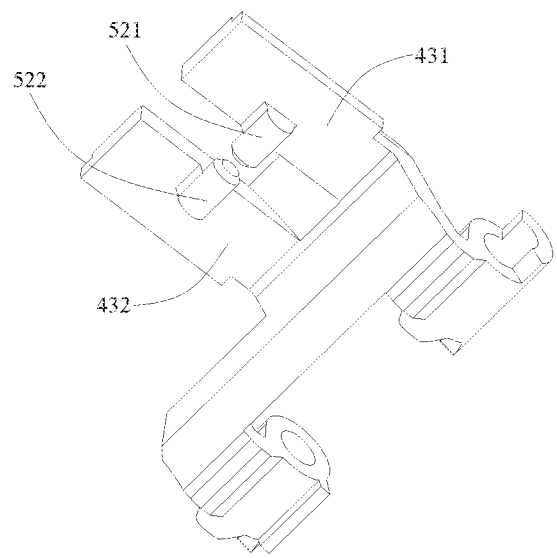
FIG. 18 is a schematic diagram of a partial structure including a sliding portion in a folding mechanism according to an embodiment of this application.

In some embodiments, as shown in FIG. 18, an end of the first sliding portion 521 facing the second sliding portion 522 and/or an end of the second sliding portion 522 facing the first sliding portion 521 are/is provided with an arc-shaped guiding end. The arc-shaped guiding end may be a spherical surface structure. In some embodiments, the arc-shaped guiding end may be provided with a clearance structure, for example, a chamfer. Under the action of the arc-shaped guiding end, a probability that the first sliding portion 521 and/or the second sliding portion 522 are/is stuck at a sliding trajectory of a groove-shaped or hole-shaped structure disposed in the track body 510 can be effectively reduced, to improve smoothness of fitting between the slide member 520 and the track body 510. This reduces the difficulty of opening or closing the folding mechanism, and improves user experience of the electronic device using the folding mechanism.

Figure 10:
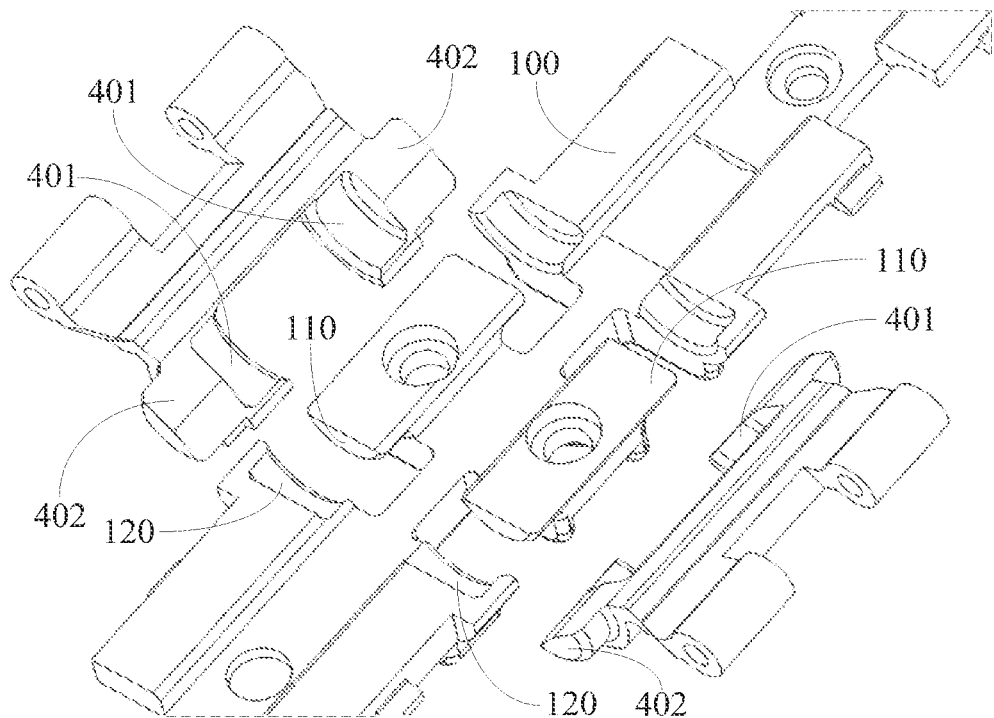
FIG. 10 is a schematic diagram of a first swing arm and a second swing arm in a folding mechanism fitting a base portion according to an embodiment of this application.
Figure 11:
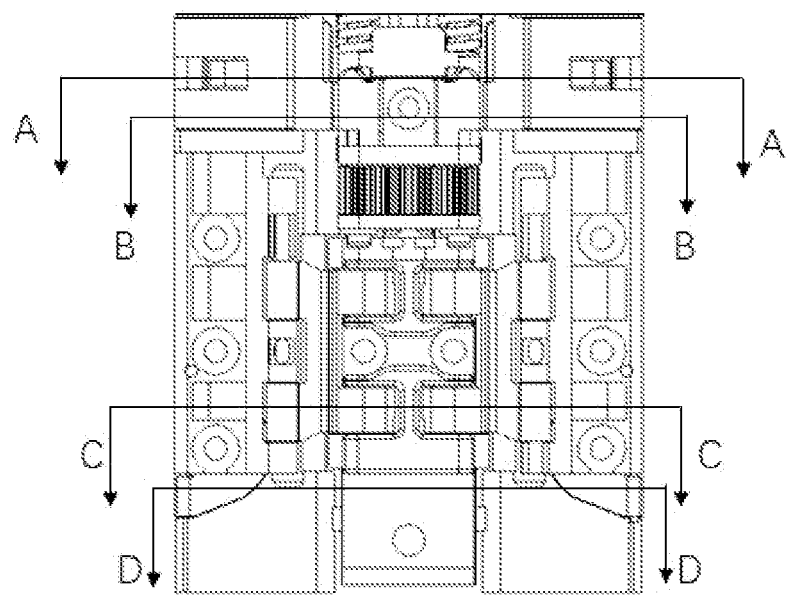
FIG. 11 is a schematic diagram of a partial structure in a folding mechanism according to an embodiment of this application.
Figure 12:
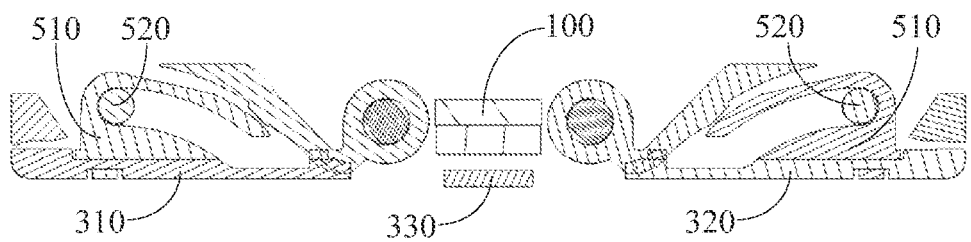
FIG. 12 is a schematic cross-sectional view of the structure shown in FIG. 11 in a direction A-A.
Figure 13:
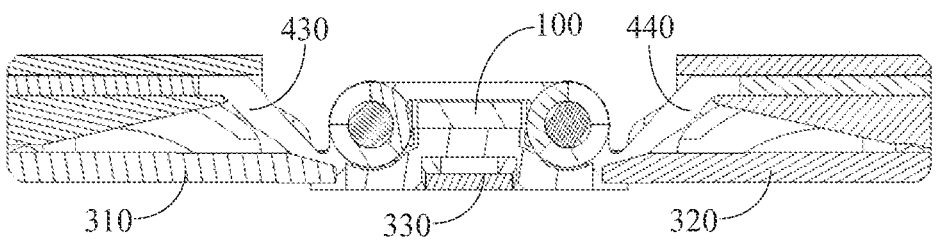
FIG. 13 is a schematic cross-sectional view of the structure shown in FIG. 1I in a direction B-B.
Figure 14:
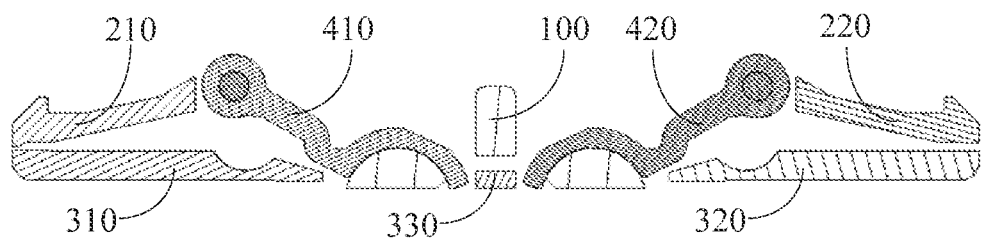
FIG. 14 is a schematic cross-sectional view of the structure shown in FIG. 11 in a direction C-C.
Figure 15:
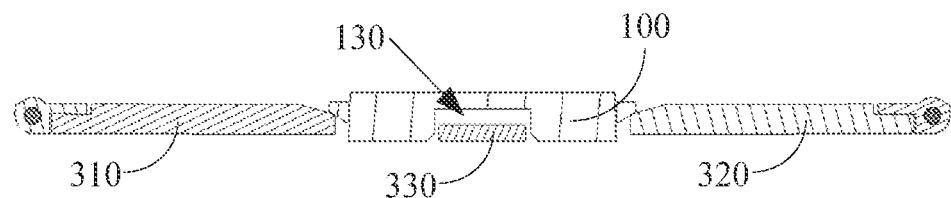
FIG. 15 is a schematic cross-sectional view of the structure shown in FIG. 11 in a direction D-D.

As discussed above, a rotatable fitting relationship may be respectively formed between the first swing arm 410 and the base portion 100 and between the second swing arm 420 and the base portion 100 by using a rotatable connection mechanism, for example, a shaft hole fitting structure. In a specific embodiment of this application, as shown in FIG. 6 and FIG. 10, each of the first ends of the first swing arm 410 and the second swing arm 420 is provided with a first rotatable portion 401 and a second rotatable portion 402 distributed in the rotational axis direction of the first swing arm 410. Each of the two opposite sides of the base portion 100 is provided with a third rotatable portion 110 and a fourth rotatable portion 120. Each first rotatable portion 401 rotatably fits the corresponding third rotatable portion 110, and each second rotatable portion 402 rotatably fits the corresponding fourth rotatable portion 120. Through the joint action of the first rotatable portion 401 and the second rotatable portion 402, in a case that a rotatable connection relationship is formed between the first swing arm 410 (and the second swing arm 420) and the base portion 100, so that reliability and stability of the rotatable connection relationship between the first swing arm 410 (and the second swing arm 420) and the base portion 100 can be improved.

In addition, positions and structures of the first rotatable portion 401 and the second rotatable portion 402 are designed, so that it can be ensured that the first swing arm 410 and the second swing arm 420 are both in limiting fit with the base portion 100 in a direction perpendicular to an extension direction of the base portion 100, to further improve the stability of fitting between and structural reliability of the first swing arm 410 and the second swing arm 420 and the base portion 100.

In some embodiments, the structures of the first rotatable portion 401 and the second rotatable portion 402 may be the same, to reduce processing difficulty of the first swing arm 410 and the second swing arm 420. The first rotatable portion 401 may be a cylindrical structural member provided with a shaft hole or provided with a through shaft. Correspondingly, the third rotatable portion 110 may be a cylindrical structural member provided with a through shaft or provided with a shaft hole. In addition, the through shaft may be provided with a retraction capability through an elastic member, so that in a process of assembling the first rotatable portion 401 and the third rotatable portion 110, the through shaft can be inserted into a corresponding shaft hole, so that while the first rotatable portion 401 is rotatably connected to the third rotatable portion 110, the two form a limiting fitting relationship with the base portion 100 in the direction perpendicular to the extension direction of the base portion 100. In addition, in the first swing arm 410 (and/or the second swing arm 420), a partition may be disposed between the first rotatable portion 401 and the second rotatable portion 402, or, the first rotatable portion 401 and the second rotatable portion 402 may be disposed in proximity. This is not limited herein.

In some embodiments of this application, each of the first rotatable portion 401, the second rotatable portion 402, the third rotatable portion 110, and the fourth rotatable portion 120 may be provided with an arc-shaped fitting member. In some embodiments, the first rotatable portion 401 and the third rotatable portion 110 are provided with arc-shaped fitting surfaces that correspond to each other, so that a rotatable fitting relationship can be formed between the two. Correspondingly, the second rotatable portion 402 and the fourth rotatable portion 120 are provided with arc-shaped fitting surfaces that correspond to each other, so that a rotatable fitting relationship can also be formed between the second rotatable portion 402 and the fourth rotatable portion 120. In some embodiments, structures of the arc-shaped fitting surfaces of the first rotatable portion 401 and the second rotatable portion 402 may be the same, or may be different. This is not limited herein.

In addition, to ensure implementation of rotatable connection between the first housing seat 210 and the base portion 100 by the first rotatable portion 401 and the third rotatable portion 110 and the second rotatable portion 402 and the fourth rotatable portion 120, the first swing arm 410 (and the second swing arm 420) can further form a limiting relationship with the base portion 100 in the direction perpendicular to the extension direction of the base portion 100. As shown in the figure, the arc-shaped fitting surface of the first rotatable portion 401 and the arc-shaped fitting surface of the second rotatable portion 402 are disposed facing opposite directions. In some embodiments, if an arc-shaped surface of the arc-shaped fitting surface of the first rotatable portion 401 faces upward, an arc-shaped surface of the arc-shaped fitting surface of the second rotatable portion 402 may face downward. In a case that the foregoing technical solution is used, the third rotatable portion 110 fits the first rotatable portion 401, and the fourth rotatable portion 120 fits the second rotatable portion 402, so that it may be ensured that the first swing arm 410 (and the second swing arm 420) and the base portion 100 can limit each other in the direction perpendicular to the extension direction of the base portion 100.

Correspondingly, in a case that the foregoing technical solution is used for the first rotatable portion 401 and the second rotatable portion 402 on the first swing arm 410, for the first rotatable portion 401 and the second rotatable portion 402 on the second swing arm 420, refer to the arrangement in the foregoing technical solution. In some embodiments, sizes, positions relationships, and the like of the first rotatable portion 401 and the second rotatable portion 402 disposed on the second swing arm 420 may be correspondingly the same as or may be different from the sizes, positions relationships, and the like of the first rotatable portion 401 and the second rotatable portion 402 disposed on the first swing arm 410. For this, this is not limited herein.

To further improve stability of the fitting relationships between the first swing arm 410 and the second swing arm 420 and the base portion 100, as shown in the figure, two second rotatable portions 402 are disposed on at least one of the first swing arm 410 or the second swing arm 420, and at least one first rotatable portion 401 is disposed between the two second rotatable portions 402. Because directions of limitations of the first rotatable portion 401 and the second rotatable portion 402 on the first swing arm 410 are opposite, through the foregoing technical solution, in a case that two opposite sides of the first rotatable portion 401 are both provided with the second rotatable portion 402, the first swing arm 410 and the base portion 100 may be further kept from tilting toward each other, to improve the stability of the fitting between the first swing arm 410 and the base portion 100. To ensure that the stability of fitting between components in the entire folding mechanism is adequate, the foregoing technical solution may be used for both the first swing arm 410 and the second swing arm 420.

Furthermore, the first swing arm 410 is used as an example. In the first swing arm 410, a fitting groove is provided in the first rotatable portion 401, a fitting bump is disposed at the second rotatable portion 402, and the fitting groove and the fitting bump are both provided with arc-shaped fitting surfaces. Correspondingly, the fitting groove and the fitting bump having the arc-shaped fitting surfaces may be formed on the base portion 100 through etching, drilling, or the like, so that the fitting groove and the fitting bump formed on the base portion 100 are used respective at least parts of the third rotatable portion 110 and the fourth rotatable portion 120 to respectively correspondingly fit the first rotatable portion 401 and the second rotatable portion 402, so that while rotatable fitting of the first swing arm 410 and the base portion 100 is implemented, the two can limit each other in the direction perpendicular to the extension direction of the base portion 100.

In a case that the foregoing structure is used, to ensure that the first swing arm 410 can normally form a fitting relationship with the base portion 100, each fitting groove needs to have a groove opening, so that a corresponding structure in the first swing arm 410 extends into the fitting groove from the groove opening of the fitting groove in the base portion 100. In addition, the corresponding structure on the base portion 100 may also extend into the fitting groove from the groove opening of the fitting groove in the first swing arm 410, to implement a rotatable connection between the first swing arm 410 and the base portion 100.

In some embodiments, a positions relationship between the fitting bump and the groove opening of the fitting groove may be adaptively adjusted and configured. As shown in the figure, in the first swing arm 410, the fitting bump may be disposed on a side of the fitting groove away from the groove opening of the fitting groove. In the base portion 100, the fitting bump may be disposed on a side that the groove opening of the fitting groove faces. In a case that the foregoing technical solution is used, a space occupied by the third rotatable portion 110 and the fourth rotatable portion 120 on the base portion 100 can be greatly reduced, so that difficulty and workload of forming the third rotatable portion 110 and the fourth rotatable portion 120 can be reduced to a particular degree.

Figure 7:
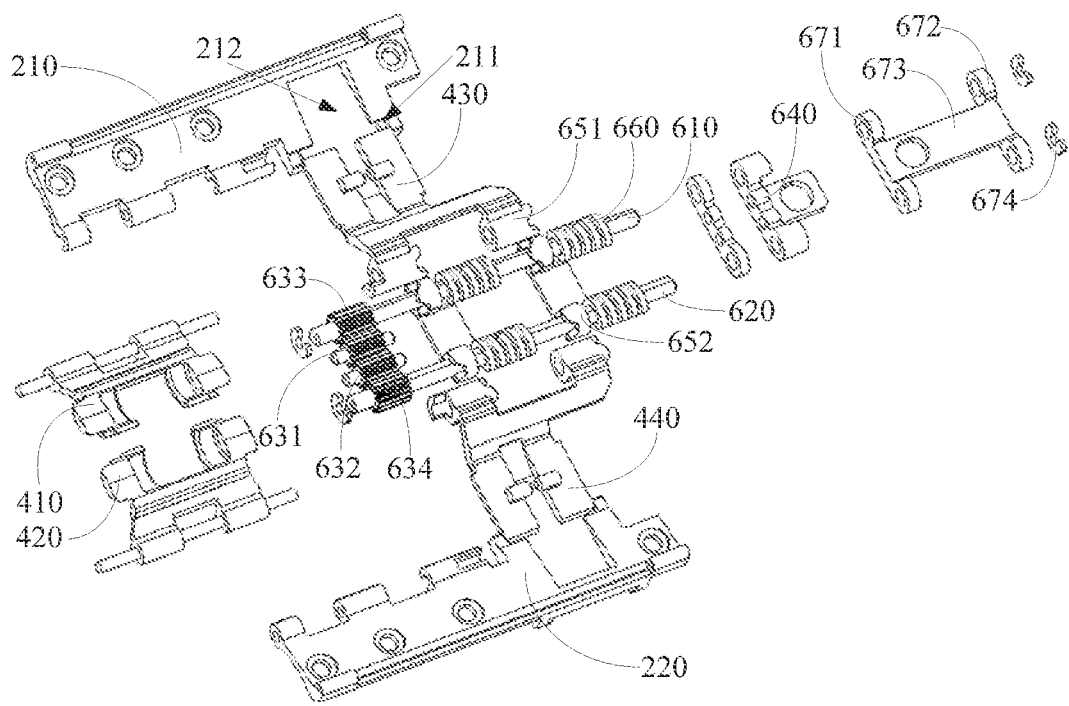
FIG. 7 is a schematic exploded view of a structure shown in FIG. 6.
Figure 8:
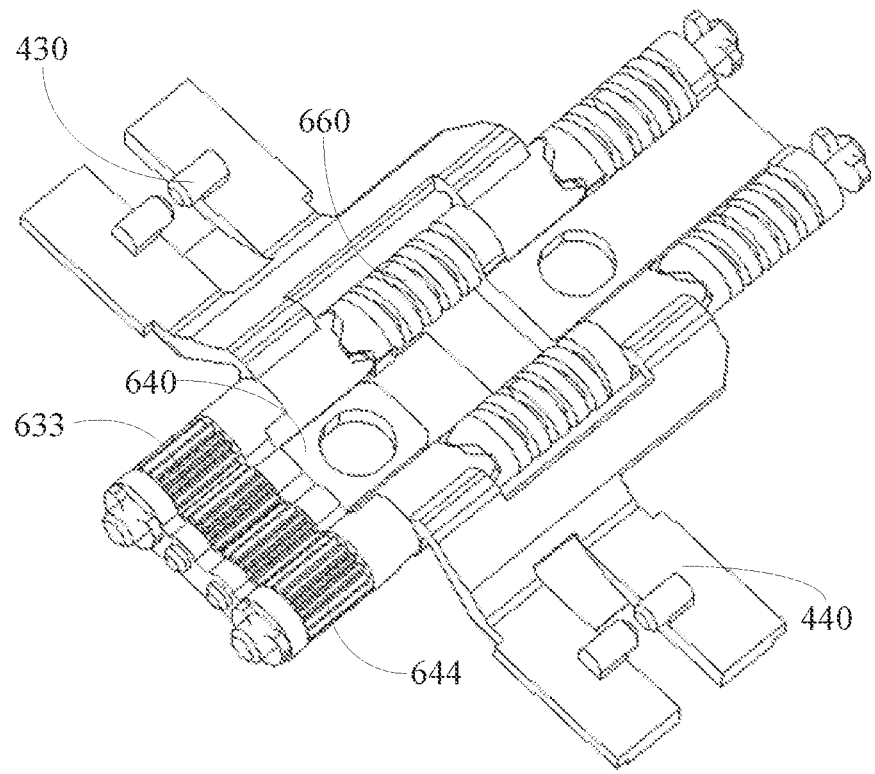
FIG. 8 is a schematic diagram of a partial structure including a gear synchronization mechanism in a folding mechanism according to an embodiment of this application.
Figure 9:
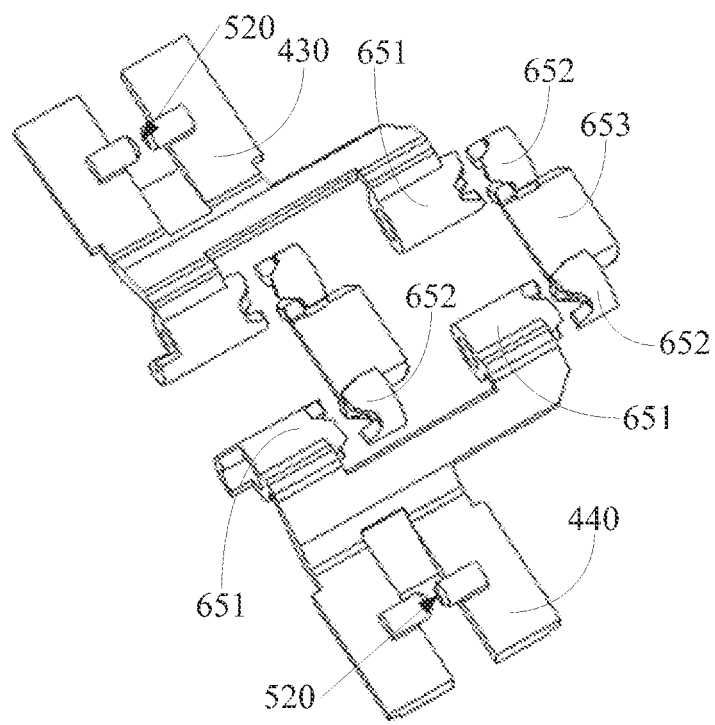
FIG. 9 is a schematic exploded view of a partial structure including a first cam sleeve and a second cam sleeve in a folding mechanism according to an embodiment of this application.

As shown in FIG. 6 to FIG. 8, the folding mechanism provided in embodiments of this application may further include a first connecting shaft 610 and a second connecting shaft 620, and the first connecting shaft 610 and the second connecting shaft 620 are both rotatably mounted on the base portion 100. In some embodiments, a structure, for example, a mounting groove, for mounting the first connecting shaft 610 and the second connecting shaft 620 may be provided in the base portion 100, and the first connecting shaft 610 and the second connecting shaft 620 are rotatably mounted in the mounting groove or the like, so that the first connecting shaft 610 and the second connecting shaft 620 can both form the rotatable fitting relationships with the base portion 100. In addition, the first connecting shaft 610 and the second connecting shaft 620 may be spaced apart from each other, to keep as much as possible the two rotation processes from interfering with each other.

In addition, the third swing arm 430 is in limiting fit with the first connecting shaft 610 in a rotational direction of the first swing arm 410, and the fourth swing arm 440 is in limiting fit with the second connecting shaft 620 in the rotational direction, so that when rotating, the third swing arm 430 can drive the first connecting shaft 610 to rotate together, and when rotating, the fourth swing arm 440 can drive the second connecting shaft 620 to rotate together. In some embodiments, the third swing arm 430 may be sleeved on the first connecting shaft 610, the fourth swing arm 440 may be sleeved on the second connecting shaft 620, and the two groups of components are both correspondingly formed with an interference fitting relationship, so that the third swing arm 430 may rotate synchronously with the first connecting shaft 610, and the fourth swing arm 440 may rotate synchronously with the second connecting shaft 620. In another embodiment of this application, a limiting fitting relationship may be formed between the third swing arm 430 and the first connecting shaft 610 through a key joint. Correspondingly, a limiting fitting relationship may be formed between the fourth swing arm 440 and the second connecting shaft 620 through a key joint. This can further improve stability of the limiting fitting relationships.

Based on the foregoing technical content, further, the first connecting shaft 610 and the second connecting shaft 620 are connected by a gear synchronization mechanism. The gear synchronization mechanism may include two gears. The two gears are meshed with each other, and are respectively correspondingly connected to the first connecting shaft 610 and the second connecting shaft 620, so that a transmission connection relationship may be formed between the first connecting shaft 610 and the second connecting shaft 620. In addition, based on the connection relationship between the first connecting shaft 610 and the first housing seat 210 and the connection relationship between the second connecting shaft 620 and the second housing seat 220, the first housing seat 210 and the second housing seat 220 can also rotate synchronously through the gear synchronization mechanism. In a case that the foregoing technical solution is used, it may be ensured that the first screen supporting plate 310 and the second screen supporting plate 320 have a capability of rotating synchronously, so that regardless of which of the two is driven, the other one of the two may be driven by the gear synchronization mechanism or the like to rotate relative to the base portion 100, to ensure that rotational angles of the first screen supporting plate 310 and the second screen supporting plate 320 relative to the base portion 100 remain the same, to improve comprehensive performance of the entire folding mechanism.

In some embodiments of this application, as shown in the figure, the gear synchronization mechanism includes a first gear 631, a second gear 632, first meshing teeth 633 disposed on the first connecting shaft 610, and second meshing teeth 634 disposed on the second connecting shaft 620, the first meshing teeth 633 are meshed with the first gear 631, the first gear 631 is meshed with the second gear 632, and the second gear 632 is meshed with the second meshing teeth 634. When the foregoing technical solution is used, diameters of the components in the gear synchronization mechanism may be small, so that a space occupied by the gear synchronization mechanism in the folding mechanism is reduced as much as possible, to eventually improve utilization of a space inside the electronic device.

In some embodiments, the first connecting shaft 610 and the first meshing teeth 633 may form a gear shaft. Correspondingly, the second connecting shaft 620 and the second meshing teeth 634 may also form a gear shaft. Because respective rotational angles of the first housing seat 210 and the second housing seat 220 relative to the base portion 100 are usually not greater than 180°, the first meshing teeth 633 may cover a quarter of circle to a half of circle of the first connecting shaft 610. Correspondingly, the second meshing teeth 634 may cover a quarter of circle to a half of circle of the second connecting shaft 620. This may basically ensure that the first meshing teeth 633 and the second meshing teeth 634 can provide a reliable synchronization function, and can reduce production costs. In some embodiments, to improve as much as possible reliability of the gear synchronization mechanism, the first meshing teeth 633 may completely cover a circumference of the first connecting shaft 610, and the second meshing teeth 634 may also completely cover a circumference of the second connecting shaft 620.

In some embodiments, amounting shaft may be disposed on the base portion, and the first gear 631 and the second gear 632 are both sleeved on the corresponding mounting shaft, to ensure that when the folding mechanism operates, positions of the first gear 631 and the second gear 632 remain unchanged, to provide a stable reliable transmission function. In some embodiments, the gear synchronization mechanism may be provided with a gear holder 640. The gear holder 640 may be provided with a gear shaft, and the gear holder 640 may be mounted on the base portion 100 by a screw or another connecting member, so that processing difficulty of the base portion 100 is reduced. In some embodiments, the gear holder 640 may be provided with a shaft hole. In this case, the first gear 631 and the second gear 632 may both have a shaft gear. To be specific, each of the two has a gear shaft. The respective gear shafts of the first gear 631 and the second gear 632 are rotatably mounted in the shaft hole of the gear holder 640, so that the first gear 631 and the second gear 632 may form stable assembly relationships with the base portion 100

In some embodiment of this application, the folding mechanism may further include a first cam sleeve 651, a second cam sleeve 652, and an elastic member 660, the first cam sleeve 651 and the second cam sleeve 652 are sleeved on the first connecting shaft 610, the first cam sleeve 651 is fastened on the third swing arm 430, the second cam sleeve 652 rotatably fits the first connecting shaft 610 in a rotational direction of the first swing arm 410, and in a case that the first cam sleeve 651 and the second cam sleeve 652 rotate relatively, the elastic member 660 is in a stretched state or a retracted state.

In some embodiments, specific structures of the first cam sleeve 651 and the second cam sleeve 652 may be the same. The two are snapped. In a process in which the first cam sleeve 651 and the second cam sleeve 652 rotate relatively, a maximum distance between the first cam sleeve 651 and the second cam sleeve 652 is greater than an initial distance (to be specific, a minimum distance) between the two. In this case, the elastic member 660 is stretched or compressed, so that the elastic member 660 can apply an elastic restoration force to the first cam sleeve 651 and/or the second cam sleeve 652, to drive the first cam sleeve 651 and the second cam sleeve 652 to restore a snapped state, to be specific, a state in which the two have the smallest distance.

Through the foregoing technical solution, relative positions of the first cam sleeve 651 and the second cam sleeve 652 in the snapped state may be designed, so that when the folding mechanism is in the folded state and the unfolded state, the first cam sleeve 651 and the second cam sleeve 652 are both in a snapped state. Provided that the folding mechanism is in a non-folded state and non-unfolded state, due to relative rotation of the first cam sleeve 651 and the second cam sleeve 652, the distance between the first cam sleeve 651 and the second cam sleeve 652 is increased, making the elastic member 660 stretched or compressed. Therefore, in a case that the foregoing technical solution is used, the folding mechanism may be easily kept in the unfolded state and the folded state through the elastic member 660, and the unfolded state or the folded state of the folding mechanism may be kept from damage by a small external force, causing inconvenience to the user.

In some embodiments, the folding mechanism further includes a mounting member 673. The mounting member 673 is fastened on the base portion 100. In some embodiments, the mounting member 673 may be fastened on the base portion 100 through welding or by a connecting member. A first limiting member 671 and a second limiting member 672 that are opposite in a rotational axis direction of the second rotatable portion 402 and are fastened are disposed in the mounting member 673, the first cam sleeve 651, the second cam sleeve 652, and the elastic member 660 are disposed between the first limiting member 671 and the second limiting member 672, and the elastic member 660 is disposed on a side of the second cam sleeve away from the first cam sleeve. In a case that the foregoing technical solution is used, the first limiting member 671 and the second limiting member 672 may provide a positioning basis, so that in one aspect reliability of the elastic member 660 can be improved, and in another aspect mounting difficulty of the elastic member 660 can be further reduced.

In a case that the foregoing technical solution is used, the first cam sleeve 651 and the second cam sleeve 652 rotate relatively, and the elastic member 660 is compressed, so that the elastic member 660 applies to, the first cam sleeve 651 and the second cam sleeve 652, an elastic force for facilitating restoration of the two. To further avoid the problem that it is difficult for the folding mechanism to remain in the folded state and the unfolded state, the elastic member 660 may be provided with a pretensioning force, to be specific, when the first cam sleeve 651 and the second cam sleeve 652 are in a snapped state, the elastic member 660 may also be in the compressed state.

In some embodiments, the first cam sleeve 651 and the third swing arm 430 may be connected to each other through welding, integral formation, or the like, and the third swing arm 430 may form a limiting fitting relationship with the first connecting shaft 610 through the first cam sleeve 651 in a rotational direction of the second rotatable portion 402. In some embodiments, the first cam sleeve 651 and the first connecting shaft 610 may be connected to each other through a key joint. An inner circumferential surface of the second cam sleeve 652 may have a circular structure, to ensure that the second cam sleeve 652 can normally rotate relative to the first connecting shaft 610. In some embodiments, to keep the second cam sleeve 652 from rotating along with the first cam sleeve 651 together with the first connecting shaft 610 in a process in which the first connecting shaft 610 rotates along with the third swing arm 430, the second cam sleeve 652 may be in limiting fit with the base portion 100 in the rotational direction of the second rotatable portion 402.

In addition, the first limiting member 671, the second limiting member 672, and the mounting member 673 may be formed through integral formation, to improve stability of connection relationships between the three. Each of the first limiting member 671 and the second limiting member 672 may be provided with a fitting hole, and two opposite ends of the first connecting shaft 610 and the second connecting shaft 620 respectively fit the first limiting member 671 and the second limiting member 672. In some embodiments, the fitting holes may both be penetrating holes, and the first connecting shaft 610 and the second connecting shaft 620 both pass through the first limiting member 671 and the second limiting member 672, and subsequently, through a circlip 674 or another structure, the first connecting shaft 610 and the second connecting shaft 620 can both form stable rotatable fitting relationships with the mounting member 673. In addition, the first gear 631 and the second gear 632 may also be rotatably mounted on the first limiting member 671 or the second limiting member 672 by the gear shaft or another component, so that the first gear 631 and the second gear 632 can be in stable transmission fit with the first meshing teeth 633 and the second meshing teeth 634. In addition, in a case that the foregoing technical solution is used, the gear holder 640 described above may be disposed, or the gear holder 640 may be no longer disposed. This may be determined according to an actual case.

In some embodiments, the first cam sleeve 651 is fastened on each of the third swing arm 430 and the fourth swing arm 440, and each first cam sleeve 651 is correspondingly equipped with the second cam sleeve 652 and the elastic member 660. In other words, in a case that the folding mechanism is in the unfolded state and the folded state, elasticity of the elastic member 660 may be applied on both a side on which the third swing arm 430 is located and a side on which the fourth swing arm 440 is located, the elastic force may keep the folding mechanism from being released from the unfolded state and the folded state, to improve a capability of stably keeping the unfolded state and the folded state of the folding mechanism. In some embodiments, a plurality of groups of the first cam sleeve 651, the second cam sleeve 652, and the elastic member 660 that fit each other may be disposed in both the third swing arm 430 and the fourth swing arm 440, to further improve the capability of keeping the folded state and the unfolded state of the folding mechanism.

As discussed above, components such as the second cam sleeve 652 and the base portion 100 may form limiting relationships that satisfy requirements, to avoid that the first cam sleeve 651 and the second cam sleeve 652 cannot move in an axial direction because the second cam sleeve 652 rotates along with the first cam sleeve 651 when the first cam sleeve 651 rotates. Based on the foregoing case, in a case that the third swing arm 430 and the fourth swing arm 440 are both equipped with the first cam sleeve 651, as shown in the figure, a connecting rod 653 may be disposed between the second cam sleeves 652 that respectively fit the two first cam sleeves 651 in a one-to-one correspondence. In this case, in one aspect, the second cam sleeves 652 may be respectively mounted on the first connecting shaft 610 and the second connecting shaft 620, to reduce assembly difficulty, and in another aspect, the two second cam sleeves 652 may have a capability of moving synchronously, to further improve the capability of keeping the folded state and the unfolded state of the folding mechanism. In addition, the two second cam sleeves 652 are connected by the connecting rod 653, so that in a process of designing and assembling the second cam sleeves 652, a limiting structure does not need to be separately configured for the second cam sleeve 652. Under the joint action of the connecting rod 653 and the two second cam sleeves 652, the second cam sleeve 652 can respectively rotate relative to the first connecting shaft 610 and the second connecting shaft 620, and it can be basically ensured that the second cam sleeve 652 does not rotate as the first cam sleeve 651 rotates.

Figure 2:
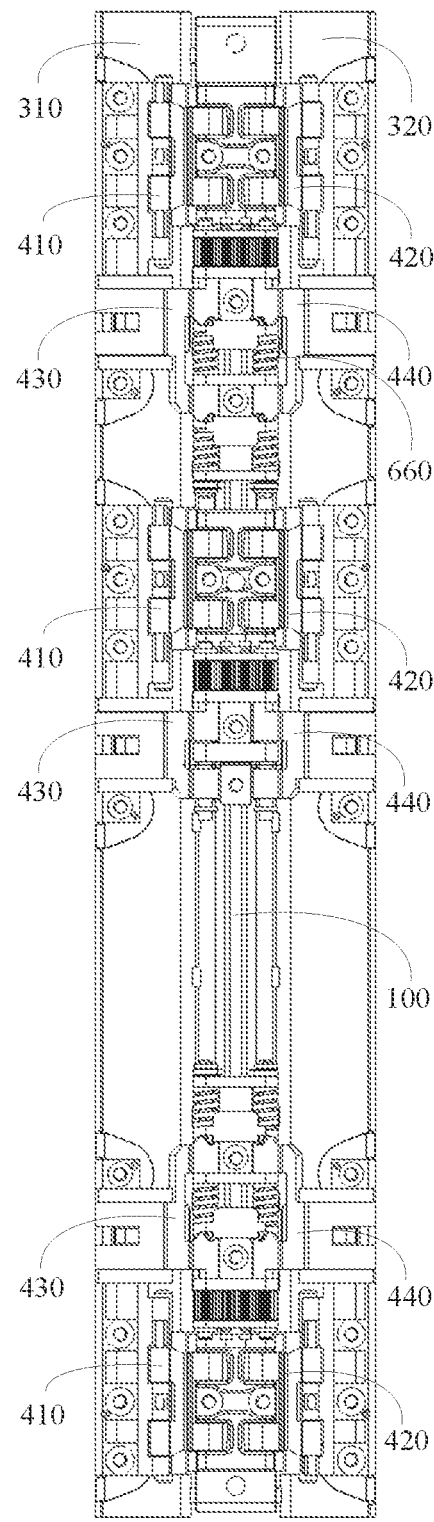
FIG. 2 is a schematic structural diagram of a folding mechanism in another direction according to an embodiment of this application.
Figure 3:
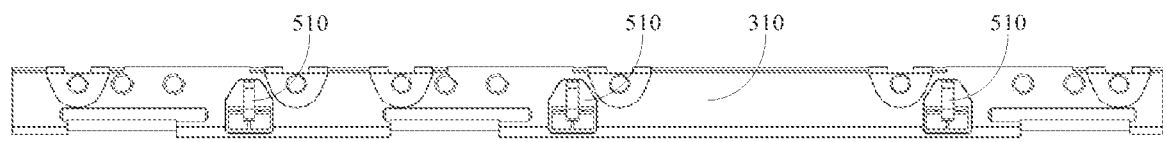
FIG. 3 is a schematic diagram of a partial structure including a first screen supporting plate in a folding mechanism according to an embodiment of this application.
Figure 4:
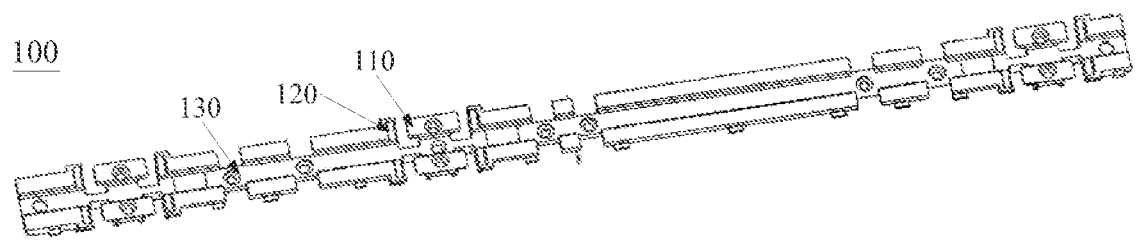
FIG. 4 is a schematic structural diagram of abase portion in a folding mechanism according to an embodiment of this application.

To improve the reliability of the connection relationship between the first housing seat 210 (and the second housing seat 220) and the base portion 100, as shown in FIG. 2, there may be a plurality of swing arm assemblies. The plurality of swing arm assemblies are distributed in an axial direction of the first swing arm 410, and to keep as much as possible the swing arm assemblies from interfering with each other, any two adjacent swing arm assemblies may be spaced apart from each other in the rotational axis direction. In some embodiments, there may be two, three or more swing arm assemblies, and the plurality of swing arm assemblies may include two symmetrically disposed swing arm assemblies, to ensure that the entire folding mechanism has reliable folding performance.

As discussed above, specific structures of corresponding components in the folding mechanism may be symmetrically disposed. Further, as shown in FIG. 6, in the assembled folding mechanism, the first swing arm 410 and the second swing arm 420 may be opposite to each other, and the third swing arm 430 and the fourth swing arm 440 are opposite to each other. In some embodiments, in a case that structures of the first swing arm 410 and the second swing arm 420 are symmetrical with each other, the first swing arm 410 and the second swing arm 420 that are disposed on two opposite sides of the base portion 100 and that respectively fit the third rotatable portion 110 and the fourth rotatable portion 120 are also disposed corresponding to each other, and the first swing arm 410 and the second swing arm 420 may be mounted opposite to each other on the base portion 100. Correspondingly, for an assembly process of the third swing arm 430 and the fourth swing arm 440, refer to the design and mounting of the first swing arm 410 and the second swing arm 420. Through the foregoing technical solution, the symmetry of the folding mechanism can be greatly improved, to improve folding and unfolding performance of the folding mechanism, and the first screen supporting plate 310 and the second screen supporting plate 320 may have better synchronism, to improve support for a flexible display screen.

As discussed above, the third screen supporting plate 330 and the base portion 100 can move relative to each other. In some embodiments, an accommodating groove 130 provided concave in the support direction is provided in the base portion 100. The third screen supporting plate is movably mounted in the accommodating groove 130. In a case that the foregoing technical solution is used, when the folding mechanism is in the unfolded state, the third screen supporting plate 330 may be located in the accommodating groove 130 of the base portion 100, and a screen supporting surface of the third screen supporting plate 330 is flush with a surface of the base portion 100 facing the flexible screen, to jointly provide support for the flexible screen. When the folding mechanism is in the folded state and the third screen supporting plate 330 moves toward a part (to be specific, the accommodating groove 130) of the base portion 100 facing the third screen supporting plate 330, the third screen supporting plate 330 may be accommodated in the accommodating groove 130. Apparently, through the foregoing technical solution, a maximum size and a minimum size of a combined structure of the third screen supporting plate 330 and the base portion 100 are close, so that a space waste in the electronic device is reduced as much as possible. In some embodiments, in a case that requirements are different, when the folding mechanism is in the unfolded state, the third screen supporting plate 330 may also extend from inside the accommodating groove 130 and support the flexible screen. This is not limited herein.

Figure 16:
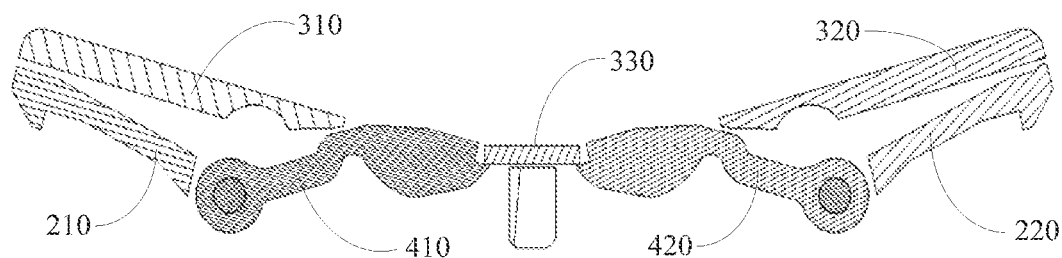
FIG. 16 is a status diagram of a first swing arm and a second swing arm in a folding mechanism fitting a third screen supporting plate according to an embodiment of this application.
Figure 17:
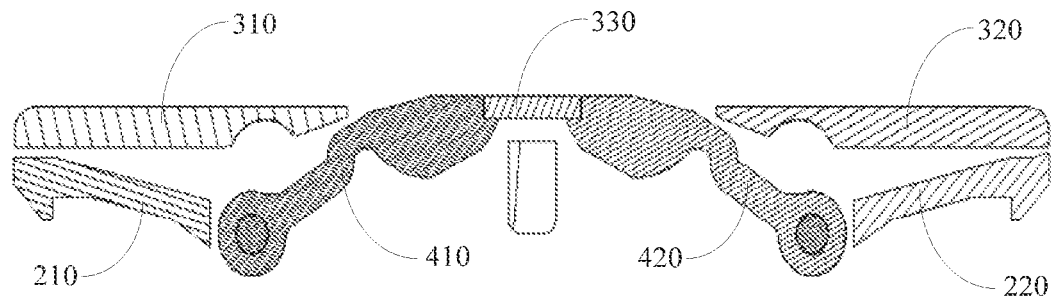
FIG. 17 is another status diagram of a first swing arm and a second swing arm in a folding mechanism fitting a third screen supporting plate according to an embodiment of this application.

As discussed above, there may be various driving sources for the third screen supporting plate 330 to move relative to the base portion 100 in the support direction. To ensure that the third screen supporting plate 330 may provide reliable support for the flexible screen, when the folding mechanism is in the unfolded state, the third screen supporting plate 330 is supported at the first end of the first swing arm 410 and the first end of the second swing arm 420. In other words, as shown in FIG. 16 and FIG. 17, in a process in which the first swing arm 410 and the second swing arm 420 rotate relative to the base portion 100 and are unfolded, the first swing arm 410 and the second swing arm 420 can fit the third screen supporting plate 330 at a time point, so that as the first swing arm 410 and the second swing arm 420 continue to be unfolded, the third screen supporting plate 330 can move away from a part of the base portion 100 opposite to the third screen supporting plate 330 (for example, the accommodating groove 130 described above). When the first swing arm 410 and the second swing arm 420 are unfolded, the third screen supporting plate 330 is just supported in a corresponding area of the flexible screen.

Figure 5:
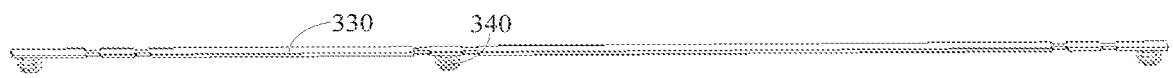
FIG. 5 is a schematic diagram of a partial structure including a third screen supporting plate in a folding mechanism according to an embodiment of this application.

Based on the foregoing embodiments, further, in a process in which the folding mechanism is switched from the unfolded state to the folded state, to enable the third screen supporting plate 330 to be more easily return to an original position, the original position is a position of the third screen supporting plate 330 after moving toward the base portion 100 by the preset distance. In some embodiments, as shown in FIG. 5, the folding mechanism may further include an elastic restoration member 340. The elastic restoration member 340 may be a spring, a rubber elastic member 660, or the like. The elastic restoration member 340 is connected between the third screen supporting plate 330 and the base portion 100. In a case that the folding mechanism is in the unfolded state, the elastic restoration member 340 is in the stretched state, so that when the first swing arm 410 and the second swing arm 420 rotate relative from the unfolded state, the third screen supporting plate 330 may move toward the base portion 100 under the action of the elastic restoration member 340. In a case that the foregoing technical solution is used, the flexible screen can be further kept from interfering with the third screen supporting plate 330 in a folding process and being squeezed, to improve the service life of the flexible screen.

Based on the folding mechanism provided in any foregoing embodiment, an embodiment of this application further provides an electronic device, including a flexible screen, a first housing, a second housing, and any foregoing folding mechanism. The first housing is fastened on a first housing seat 210. The second housing is fastened on a second housing seat 220. The flexible screen is disposed on the first housing, the second housing, the first screen supporting plate 310, the second screen supporting plate 320, and the third screen supporting plate 330. In some embodiments, the electronic device may further include a motherboard, a camera, a microphone, a receiver, and another electronic device. For conciseness, this is not described in detail herein.

The electronic device disclosed in embodiments of this application may be a mobile phone, a computer, an electronic book reader, a wearable device, or the like. A specific type of the electronic device is not limited in embodiments of this application.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses. Further, it needs to be noted that the scope of the methods and apparatuses in embodiments of this application is not limited to performing the functions in the order shown or discussed, but may also include performing the functions in a substantially simultaneous manner or in the reverse order depending on the functions involved. For example, the described methods may be performed in a different order than described, and various steps may also be added, omitted, or combined. In addition, features described with reference to some examples may be combined in other examples.

Embodiments of this application are described above with reference to the accompanying drawings. However, this application is not limited to the foregoing specific implementations. The foregoing specific implementations are illustrative instead of limitative. Enlightened by this application, a person of ordinary skill in the art can make many forms without departing from the idea of this application and the scope of protection of the claims. All of the forms fall within the protection of this application.

What is claimed is:

1. A folding mechanism, comprising a base portion, a first housing seat, a second housing seat, a first screen supporting plate, a second screen supporting plate, and a third screen supporting plate, wherein:
   the first housing seat is rotatably disposed on the first screen supporting plate, the first housing seat and the first screen supporting plate are disposed on a first side of the base portion, the second housing seat is rotatably disposed on the second screen supporting plate, the second housing seat and the second screen supporting plate are disposed on a second side of the base portion, the first side and the second side are disposed facing opposite directions, and the third screen supporting plate is movably connected to the base portion in its own support direction;
   the folding mechanism further comprises a swing arm assembly, the swing arm assembly comprises a first swing arm, a second swing arm, a third swing arm, and a fourth swing arm, the first swing arm and the third swing arm are both disposed on a same side as the first housing seat, and the second swing arm and the fourth swing arm are disposed on a same side as the second housing seat;
   a first end of the first swing arm is rotatably connected to the base portion, a second end of the first swing arm is rotatably connected to the first housing seat, a first end of the third swing arm is rotatably connected to the base portion, a second end of the third swing arm slidably fits the first housing seat, the second end of the third swing arm and the first screen supporting plate are relatively slidable and fit rotatably, and a rotation axis of the first end of the first swing arm and a rotation axis of the first end of the third swing arm are distributed spaced apart from each other;
   a first end of the second swing arm is rotatably connected to the base portion, a second end of the second swing arm is rotatably connected to the second housing seat, a first end of the fourth swing arm is rotatably connected to the base portion, a second end of the fourth swing arm slidably fits the second housing seat, the second end of the fourth swing arm and the second screen supporting plate are relatively slidable and fit rotatably, and a rotation axis of the first end of the second swing arm and a rotation axis of the first end of the fourth swing arm are distributed spaced apart from each other;
   the folding mechanism has an unfolded state and a folded state, in the unfolded state, respective screen supporting surfaces of the first screen supporting plate, the second screen supporting plate, and the third screen supporting plate are coplanar, and a distance between a part of the base portion facing the third screen supporting plate and the third screen supporting plate in the support direction is a first distance; and
   in the folded state, the distance between the part of the base portion facing the third screen supporting plate and the third screen supporting plate in the support direction is a second distance, and the second distance is smaller than the first distance.

2. The folding mechanism according to claim 1, wherein a sliding slot is opened in the first housing seat, and the second end of the third swing arm slidably fits the sliding slot.

3. The folding mechanism according to claim 2, wherein a clearance hole is opened in an inner wall of the sliding slot, a track body is fastened on the first screen supporting plate, a slide member is disposed at the second end of the third swing arm, the track body passes through the clearance hole and at least partially extends into the sliding slot, and the sliding member and the track body are relatively slidable and fit rotatably.

4. The folding mechanism according to claim 3, wherein the second end of the third swing arm comprises a first sliding block and a second sliding block spaced apart from each other in a rotational axis direction of the first swing arm, the sliding member comprises a first sliding portion and a second sliding portion, the first sliding portion is disposed on the first sliding block, the second sliding portion is disposed on the second sliding block, and the first sliding portion and the second sliding portion are spaced apart from each other in the rotational axis direction; and
   the track body comprises a first limiting portion and a second limiting portion, the first limiting portion and the second limiting portion are distributed in the rotational axis direction, an assembly notch is provided in at least one of the first limiting portion or the second limiting portion, the sliding member is connected to the track body by the assembly notch, the first sliding portion slidably fits the first limiting portion, and the second sliding portion slidably fits the second limiting portion.

5. The folding mechanism according to claim 4, wherein in the rotational axis direction, projections of the first sliding portion and the second sliding portion overlap.

6. The folding mechanism according to claim 5, wherein the first limiting portion has a first track surface, the second limiting portion has a second track surface, and in the rotational axis direction, a projection of the first track surface is located outside a projection of the second track surface.

7. The folding mechanism according to claim 6, wherein the track body further comprises a partition member, the first limiting portion is located on one side of the partition member, the second limiting portion is fastened on the other side of the partition member, and in the rotational axis direction, the partition member is limited between the first sliding portion and the second sliding portion.

8. The folding mechanism according to claim 7, wherein the first limiting portion protrudes relative to the partition member away from the second limiting portion to form the first track surface, a hollow cavity is provided in the first limiting portion, and a cavity opening of the hollow cavity faces the second limiting portion in the rotational axis direction.

9. The folding mechanism according to claim 6, wherein the first track surface is located on a side of the first limiting portion away from the first screen supporting plate, and the second track surface is located on a side of the second limiting portion facing the first screen supporting plate; and
a relief hole is provided in the first screen supporting plate, and in a direction perpendicular to the screen supporting surface of the first screen supporting plate, a projection of the second limiting portion is located in the relief hole.

10. The folding mechanism according to claim 4, wherein an end of the first sliding portion facing the second sliding portion or an end of the second sliding portion facing the first sliding portion is provided with an arc-shaped guiding end.

11. The folding mechanism according to claim 2, wherein the third swing arm and the fourth swing arm are disposed symmetrically.

12. The folding mechanism according to claim 1, wherein a first rotatable portion and a second rotatable portion distributed in a rotational axis direction of the first swing arm are both disposed at the respective first ends of the first swing arm and the second swing arm, a third rotatable portion and a fourth rotatable portion are disposed on two opposite sides of the base portion, the first rotatable portion rotatably fits the third rotatable portion, the second rotatable portion rotatably fits the fourth rotatable portion, and the first swing arm and the second swing arm are in limiting fit in the base portion in a direction perpendicular to an extension direction of the base portion.

13. The folding mechanism according to claim 12, wherein each of the first rotatable portion, the second rotatable portion, the third rotatable portion, and the fourth rotatable portion is provided with an arc-shaped fitting surface, and the arc-shaped fitting surface of the first rotatable portion and the arc-shaped fitting surface of the second rotatable portion are disposed facing opposite directions.

14. The folding mechanism according to claim 13, wherein two second rotatable portions are disposed on at least one of the first swing arm or the second swing arm, and at least one first rotatable portion is disposed between the two second rotatable portions.

15. The folding mechanism according to claim 13, wherein a fitting groove is provided in the first rotatable portion, the second rotatable portion comprises a fitting bump, each of the fitting groove and the fitting bump is provided with the arc-shaped fitting surface, and in the extension direction of the base portion, the fitting bump is disposed away from a groove opening of the fitting groove.

16. The folding mechanism according to claim 1, wherein the folding mechanism further comprises a first connecting shaft and a second connecting shaft, and the first connecting shaft and the second connecting shaft are both rotatably mounted on the base portion; and
the third swing arm is in limiting fit with the first connecting shaft in a rotational direction of the first swing arm, the fourth swing arm is in limiting fit with the second connecting shaft in the rotational direction, the first connecting shaft and the second connecting shaft are connected by a gear synchronization mechanism, and the first housing seat and the second housing seat rotate synchronously through the gear synchronization mechanism.

17. The folding mechanism according to claim 16, wherein the gear synchronization mechanism comprises a first gear, a second gear, first meshing teeth disposed on the first connecting shaft, and second meshing teeth disposed on the second connecting shaft, the first meshing teeth are meshed with the first gear, the first gear is meshed with the second gear, and the second gear is meshed with the second meshing teeth.

18. The folding mechanism according to claim 16, wherein the folding mechanism further comprises a first cam sleeve, a second cam sleeve, and an elastic member, the first cam sleeve and the second cam sleeve are sleeved on the first connecting shaft, the first cam sleeve is fastened on the third swing arm, the second cam sleeve rotatably fits the first connecting shaft in a rotational axis direction of the first swing arm, and in a case that the first cam sleeve and the second cam sleeve rotate relatively, the elastic member is in a stretched state or a retracted state.

19. The folding mechanism according to claim 18, wherein the folding mechanism further comprises a mounting member, the mounting member is fastened on the base portion, a first limiting member and a second limiting member that are opposite in the rotational axis direction and are fastened are disposed in the mounting member, the first cam sleeve, the second cam sleeve, and the elastic member are disposed between the first limiting member and the second limiting member, and the elastic member is disposed on a side of the second cam sleeve away from the first cam sleeve.

20. The folding mechanism according to claim 18, wherein the first cam sleeve is fastened on each of the third swing arm and the fourth swing arm, and each first cam sleeve is correspondingly equipped with the second cam sleeve and the elastic member.

* * * * *